United States Patent
Watanabe et al.

(10) Patent No.: US 7,373,455 B2
(45) Date of Patent: May 13, 2008

(54) STORAGE SYSTEM AND STORAGE SYSTEM CONTROL METHOD IN WHICH STORAGE AREAS CAN BE ADDED AS NEEDED

(75) Inventors: Yutaka Watanabe, Odawara (JP); Masanobu Yamamoto, Odawara (JP); Takashi Kaga, Odawara (JP)

(73) Assignee: Hitachi, Ltd., Tokyo (JP)

( * ) Notice: Subject to any disclaimer, the term of this patent is extended or adjusted under 35 U.S.C. 154(b) by 297 days.

(21) Appl. No.: 11/258,033

(22) Filed: Oct. 26, 2005

(65) Prior Publication Data

US 2007/0055704 A1 Mar. 8, 2007

(30) Foreign Application Priority Data

Sep. 2, 2005 (JP) ............................. 2005-255459

(51) Int. Cl.
*G06F 12/00* (2006.01)
(52) U.S. Cl. ..................................................... 711/114
(58) Field of Classification Search ..................... None
See application file for complete search history.

(56) References Cited

U.S. PATENT DOCUMENTS

| 7,139,888 B2* | 11/2006 | Umemura | 711/162 |
| 7,290,103 B2* | 10/2007 | Umemura | 711/162 |
| 7,299,333 B2* | 11/2007 | Mizuno et al. | 711/170 |
| 2005/0021562 A1 | 1/2005 | Idei et al. | |
| 2005/0154830 A1* | 7/2005 | Mizuno et al. | 711/114 |
| 2006/0047906 A1* | 3/2006 | Umemura | 711/114 |
| 2006/0059301 A1* | 3/2006 | Sugino et al. | 711/113 |
| 2006/0206664 A1* | 9/2006 | Umemura | 711/114 |

FOREIGN PATENT DOCUMENTS

JP 2005-031929 2/2005

* cited by examiner

*Primary Examiner*—Kevin Verbrugge
(74) *Attorney, Agent, or Firm*—Mattingly, Stanger, Malur & Brundidge, P.C.

(57) ABSTRACT

Method and apparatus for using the storage resources of a storage system effectively, thereby reducing the cost of the storage system and improving its usability. The storage system includes a first storage apparatus and a second storage apparatus. When a host writes data to a virtual volume, the data are written into a pool area. A management table associates an address in the virtual volume with a pointer indicating the data stored in the pool area. The usage amount of the pool area is monitored. When the usage amount of the pool area reaches a predetermined value, a search for available capacity is performed. An unused external volume is detected and associated with an externally connected volume. The data stored in the pool area are then copied to the externally connected volume.

10 Claims, 16 Drawing Sheets

| POOL AREA MANAGEMENT TABLE | | | | |
|---|---|---|---|---|
| ENTRY# | LU# | LBA | DATA LENGTH | POINTER |
| 0001 | LU1 | LBA 1 | DL 1 | POINTER 1 |
| 0002 | LU2 | LBA 3 | DL 2 | POINTER 2 |
| 0003 | LU2 | LBA 1 | DL 1 | POINTER 3 |
| 0004 | LU1 | LBA 4 | DL 3 | POINTER 4 |
| 0005 | – | – | – | – |
| ... | ... | ... | ... | ... |

STORAGE SYSTEM AND STORAGE SYSTEM CONTROL METHOD IN WHICH STORAGE AREAS CAN BE ADDED AS NEEDED

CROSS-REFERENCE TO RELATED APPLICATIONS

This application relates to and claims priority from Japanese Patent Application No. 2005-255459, filed on Sep. 2, 2005, the entire disclosure of which is incorporated herein by reference.

BACKGROUND OF THE INVENTION

1. Field of the Invention

The present invention relates to a storage system and a storage system control method.

2. Description of the Related Art

In various institutions such as governments, business enterprises, and universities, for example, data are managed using comparatively large-scale storage systems so that large amounts of various types of data can be handled. This type of storage system is constituted by a disk array apparatus or the like, for example. A disk array apparatus is constituted by a large number of storage devices provided in array form, and provides a storage area based on a RAID (Redundant Array of Independent Disks), for example. At least one or more logical volumes are formed on a physical storage area provided by a storage device group, and the logical volume is provided to a host computer (more specifically, a database program running on the host computer). The host computer (to be abbreviated to "host" hereafter) is able to perform data writing and reading to and from the logical volume by transmitting predetermined commands.

The amount of data to be managed in these various institutions increases by the day. In anticipation of a future increase in demand, providing storage systems with a large amount of storage areas in advance is currently being considered. However, the unit price of storage devices is decreasing year by year, and hence there are fears that the prior investment required to purchase a large amount of storage devices in preparation for a future increase in demand is excessive. The cost of the storage system is reduced by instead purchasing storage devices appropriately when a new storage area becomes necessary.

Conversely, when storage areas are only provided in accordance with current needs, it is impossible to respond immediately to new demand, and as a result the convenience of the storage system decreases. Hence there is a trade-off between cost and capacity to respond to change. In response, a technique has been proposed for managing the storage areas of each storage device existing in a storage system as virtual storage areas, releasing unused storage areas assigned to the host, and assigning these storage areas to another host (Japanese Unexamined Patent Application Publication 2005-31929).

With the technique described in this document, an unused storage area occupied by a certain host can be released forcibly and assigned to another host requiring a new storage area. In so doing, the storage resources of the storage system can be used effectively.

However, even when a host requires a new storage area, it does not always require the entire storage area immediately. Data are stored in the storage area gradually as the data processing service performed on the host progresses. In other words, the amount of data stored in the storage area is small in the initial stage and increases steadily over time. Hence, with the technique described in the above document, it is impossible to eliminate storage area waste in the initial stage.

SUMMARY OF THE INVENTION

The present invention has been designed in consideration of the problem described above, and an object of the present invention is to provide a storage system and a storage system control method with which a storage area can be used efficiently. Another object of the present invention is to provide a storage system and a storage system control method with which storage areas can be added appropriately, when needed and in the required amount. A further object of the present invention is to provide a storage system and a storage system control method with which storage areas distributed among a plurality of storage control apparatuses are used effectively, so that the storage areas can be secured as needed and in the required amount. Further objects of the present invention will become clear from the description of the embodiments below.

To achieve the objects described above, a storage system according to the present invention performs data processing corresponding to a request from an upper level apparatus, and is constituted such that a storage control apparatus is connected communicably to another storage control apparatus that is different to this storage control apparatus. The storage control apparatus comprises: a first volume constructed virtually; a second volume for storing data targeted at the first volume; a management unit for managing the relationship between a storage space of the first volume and a storage space of the second volume; a third volume generated in association with a storage area provided in the other storage control apparatus; and a control unit for performing data input/output to and from the second volume on the basis of an access request issued by the upper level apparatus in relation to the first volume, and in a predetermined case, storing first volume data, which are stored in the second volume, in the third volume.

A storage apparatus such as a disk array apparatus, or a high performance switch (a Fibre Channel switch or the like), may be used as the storage control apparatus, for example. The first volume is constructed virtually. The term "constructed virtually" indicates a virtual volume that is not a physical entity. The first volume is recognized by the upper level apparatus as a logical volume, but does not comprise a physical storage area for storing data. Therefore, data specifying the storage space of the first volume are stored in the second volume.

For example, write data are written to the second volume successively in accordance with write requests from the upper level apparatus to the first volume. The relationship between the storage position of the write data in the second volume and the address thereof in the first volume is managed by the management unit. In other words, of the virtual storage area of the first volume, only areas which correspond to the area used by the upper level apparatus are set successively in the storage area of the second volume. When the first volume data are to be read, the storage location of the requested read data is specified using the management unit, and thus the read data may be read from the second volume. In other words, of the entire area of the virtually constructed first volume, only the range that is actually in use (accessed by the upper level apparatus) is set in the storage area of the second volume. The phrase "a second volume for storing data targeted at the first volume"

may therefore be restated as "a second volume, the storage area of which is used successively in accordance with the range of the entire storage area of the first volume that has been accessed by the upper level apparatus", for example.

Hence, even when the first volume is set with a large storage area, as long as the area that is actually in use by the upper level apparatus is small, the usage amount of the second volume is also small. As a result, the small-capacity second volume can be associated with the first volume that is defined with a large capacity. Note that the second volume may be associated with each of a plurality of first volumes. The first volume itself need not comprise a physical storage area, and therefore has almost no effect on the cost of the storage system even when set with a large capacity. When more write data are written to the first volume by the upper level apparatus such that the unused storage area of the second volume decreases, for example, the control unit copies the first volume data, which are stored in the second volume, to the third volume. Thus the first volume data are transferred to the third volume. By means of this data transfer, the data of the virtual first volume are transferred to the third volume, which is connected to an external physical entity. In this specification, this phenomenon is referred to occasionally as "materialization".

Here, the third volume is associated with the storage area provided in the other storage control apparatus. Write data targeted at the third volume are transmitted to the other storage control apparatus from the storage control apparatus, and stored in the storage area of the other storage control apparatus. When data are to be read from the third volume, the read data are read from the storage area of the other storage control apparatus and transmitted to the storage control apparatus. The relationship between the first volume and second volume and the relationship between the third volume and the storage area of the other storage control apparatus are processed within the storage control apparatus, and therefore the upper level apparatus can use the storage system while remaining unconscious of this internal processing.

The third volume may be connected to the storage area of the other storage control apparatus directly or indirectly. In the case of an indirect connection, an intermediate storage area is set between the third volume and the storage area of the other storage control apparatus, for example, so that the two are connected via this intermediate storage area.

In an embodiment of the present invention, the control unit switches a data provision source for providing data to the upper level apparatus from the first volume to the third volume. As a result, the upper level apparatus is thereafter capable of accessing the third volume and performing data reading and writing from and to the third volume.

In an embodiment of the present invention, the control unit stores the first volume data stored in the second volume in the third volume when the amount of first volume data stored in the second volume reaches a preset, predetermined value. The predetermined value may be set freely by a user, or a value determined automatically may be used. For example, data transfer from the second volume to the third volume may be executed when the total size of the first volume data stored in the second volume becomes equal to the size of the first volume or reaches a predetermined proportion of the size of the first volume.

In an embodiment of the present invention, the control unit generates the third volume in association with the storage area when the predetermined case occurs. In other words, the third volume may be prepared in advance, or generated when data transfer is to be performed from the second volume to the third volume. If the third volume is generated as required, the storage resources of the storage system can be used effectively without leaving the third volume unused for long time periods.

In an embodiment of the present invention, the other storage control apparatus is provided in a plurality, and when the predetermined case occurs, the control unit selects the other storage control apparatus having the largest unused storage area from among the plurality of other storage control apparatuses, and generates the third volume in association with the unused storage area provided in the selected other storage control apparatus. In other words, the other storage control apparatus having the largest unused storage area is selected for use at the point in time when the third volume becomes necessary.

In another embodiment of the present invention, the other storage control apparatus is provided in a plurality, and when the predetermined case occurs, the control unit selects the storage control apparatus having the largest unused storage area at a predetermined future point in time from among the plurality of other storage control apparatuses, and generates the third volume in association with the current unused storage area provided in the selected other storage control apparatus. Even though a certain other storage control apparatus may comprise the largest unused storage area at the present time, if the usage rate of the storage area is high, i.e. if a large amount of the unused storage area is used in a comparatively short time period, then it may not be appropriate to select the other storage control apparatus provided with this unused storage area. Hence, the usage amount of the unused storage area is monitored periodically or irregularly, and the size of the unused storage area at a predetermined future point in time is predicted. The determination as to whether or not to associate the third volume with a certain unused storage area is then made on the basis of its predicted size.

In an embodiment of the present invention, the storage control apparatus comprises a unique storage area, and when an unused storage area of at least a predetermined size does not exist in this unique storage area, the control unit generates the third volume in association with the storage area provided in the other storage control apparatus.

In another embodiment of the present invention, the control unit releases an unused storage area currently being used by the upper level apparatus, of the unused storage area provided in the other storage control apparatus, and generates the third volume in association with this released unused storage area.

A control method for a storage system according to another aspect of the present invention is a method of controlling a storage system which performs data processing corresponding to a request from an upper level apparatus, and in which a storage control apparatus is connected communicably to another storage control apparatus that is different from this storage control apparatus. The control method comprises the steps of: associating a first volume constructed virtually with a second volume for storing data targeted at the first volume; performing data input/output to and from the second volume on the basis of an access request issued by the upper level apparatus in relation to the first volume; monitoring whether or not first volume data stored in the second volume have reached a preset, predetermined value; generating a third volume in association with a storage area provided in the other storage control apparatus when the first volume data stored in the second volume reach the predetermined value; storing the first volume data, stored in the second volume, in the third volume; and switching a data provision source for providing data to the upper level apparatus from the first volume to the third volume.

A storage control apparatus according to another aspect of the present invention is connected to another storage control apparatus and an upper level apparatus respectively via different communication networks. The storage control apparatus comprises: a first volume constructed virtually; a second volume for storing data targeted at the first volume; a management unit for managing the relationship between a storage space of the first volume and a storage space of the second volume; a third volume generated in association with a storage area provided in the other storage control apparatus; and a control unit for performing data input/output to and from the second volume on the basis of an access request issued by the upper level apparatus in relation to the first volume, and in a predetermined case, storing first volume data, which are stored in the second volume, in the third volume.

In certain cases, all or a part of the means, functions, and steps of the present invention may be configured as a computer program that is executed by a computer system. When all or a part of the constitutions of the present invention are constituted by a computer program, the computer program may be fixed to various storage media and thus distributed and so on, or may be transmitted over a communication network, for example.

BRIEF DESCRIPTION OF THE DRAWINGS

FIG. 6 is an illustrative view showing a pool area management table;

DESCRIPTION OF THE PREFERRED EMBODIMENTS

Figure 1:
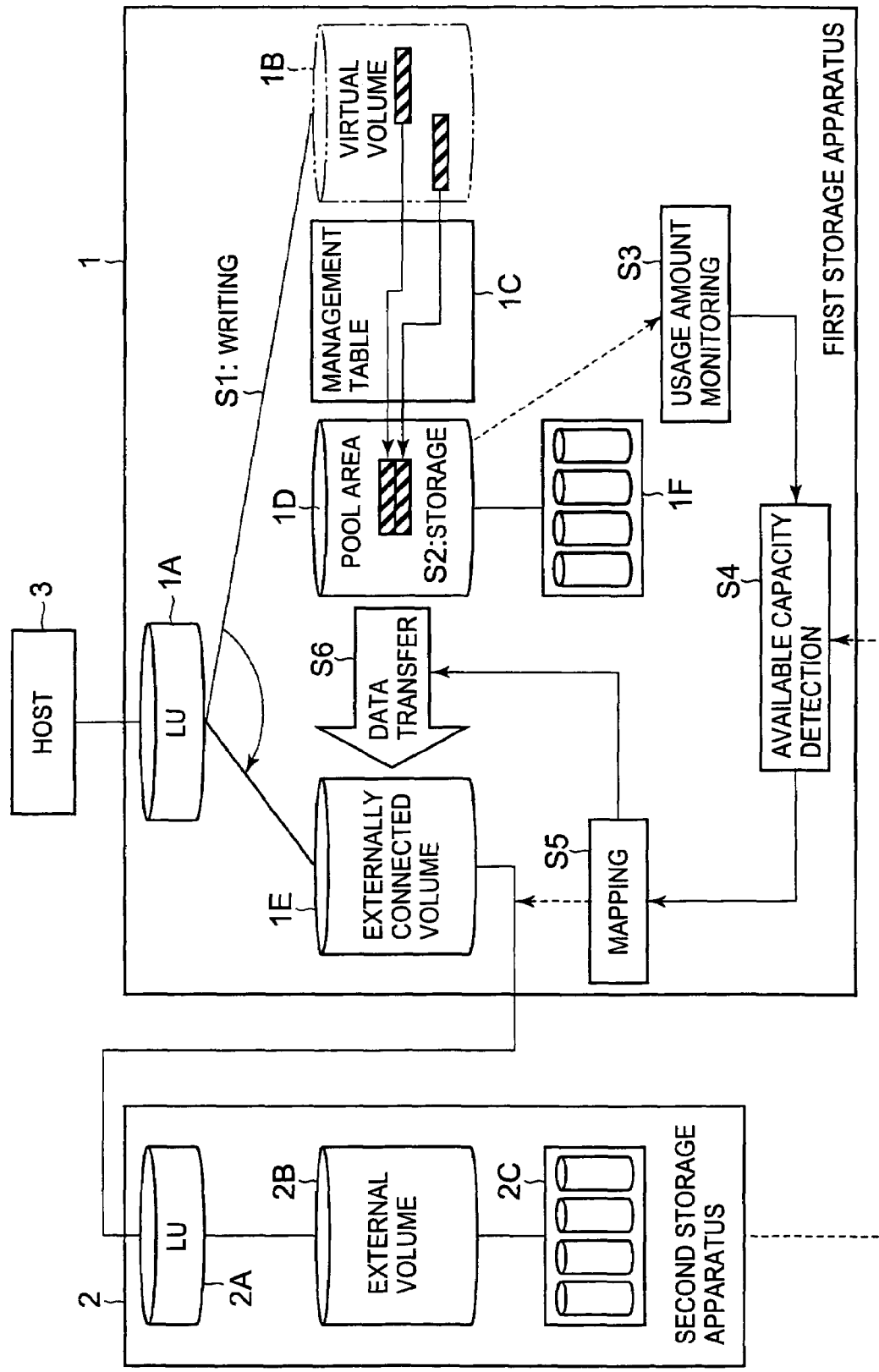
FIG. 1 is an illustrative view showing an outline of an embodiment of the present invention.

FIG. 1 is an illustrative view showing an overall outline of an embodiment of the present invention. A storage control apparatus of this embodiment is capable of importing an external storage area (storage device) to be used as though it were an internal volume of the storage control apparatus itself, as will be described below.

For example, a storage system of this embodiment may be constituted by a first storage apparatus 1 corresponding to a "storage control apparatus", a second storage apparatus 2 corresponding to "another storage apparatus", and a host 3 corresponding to a "upper level apparatus".

The first storage apparatus 1 is configured as a disk array apparatus, for example. The first storage apparatus 1 may be constituted by a logical unit (LU hereafter) 1A, a virtual volume 1B corresponding to a "first volume", a management table 1C corresponding to a "management unit", a pool area 1D corresponding to a "second volume", an externally connected volume 1E corresponding to a "third volume", and a storage unit 1F, for example.

The LU 1A is recognized and accessed by the host 3. The virtual volume 1B is connected to the LU 1A. The virtual volume 1B is a virtually constructed volume, and does not comprise a physical storage area. Data that are written to the virtual volume 1B by the host 3 are stored in the pool area 1D.

The pool area 1D is an actual volume set in a physical storage area provided by the storage unit 1F. The data that are written to the virtual volume 1B by the host 3 via the LU 1A are stored successively in the pool area 1D. The pool area 1D differs from a typical so-called journal volume in that write data transmitted to the same address are stored in the same location. In other words, a range of the entire storage area of the virtual volume 1B that corresponds to the range accessed by the host 3 is secured (set) successively in the pool area 1D.

The management table 1C manages the association between the storage space of the virtual volume 1B and the storage space of the pool area 1D. In the management table 1C, the data that area written in the virtual volume 1B are managed such that the address thereof in the virtual volume 1B is associated with the address thereof in the pool area 1D. As noted above, the data themselves are stored in the pool area 1D.

The externally connected volume 1E is an actual volume associated with an external volume 2B provided in the second storage apparatus 2. When seen from the first storage apparatus 1, the externally connected volume 1E is connected to the volume 2B in the external second storage apparatus 2, and is therefore referred to here as an externally connected volume.

The storage unit 1F comprises a plurality of storage devices, and provides a physical storage area. The pool area 1D is provided on this physical storage area. Hence, the data that are written in the pool area 1D are ultimately stored in the storage devices of the storage unit 1F. A hard disk drive, a semiconductor memory drive, an optical disk drive, a magneto-optical disk drive, a magnetic tape drive, and so on may be used as the storage devices, for example.

The second storage apparatus 2 may be constituted by an LU 2A, the volume 2B, and a storage unit 2C, for example. The second storage apparatus 2 is a separate storage apparatus provided on the exterior of the first storage apparatus 1, and is therefore also referred to as an external storage apparatus. The actual volume 2B inside the second storage apparatus 2 is also referred to as the external volume 2B.

Similarly to the LU 1A, the LU 2A serves as a window for reading and writing data from and to the volume 2B. The volume 2B is an actual volume set on a physical storage area provided by the storage unit 2C. Similarly to the storage unit 1F, the storage unit 2C may comprise a plurality of storage devices such as hard disk drives or semiconductor memory drives.

The host 3 and first storage apparatus 1 are connected via a network such as a SAN (Storage Area Network), for example. The first storage apparatus 1 and second storage apparatus 2 are connected via another network such as a SAN, for example. The communication network between the first storage apparatus 1 and second storage apparatus 2, and the communication network between the host 3 and first storage apparatus 1, may be configured as individual networks. Note that these networks are not limited to SANs, and a network such as a LAN (Local Area Network), for example, may also be used.

Next, an overall operation of the storage system will be described. The host 3 writes data to the virtual volume 1B via the LU 1A (S1). The actual data are written to the pool area 1D (S2). The management table 1C determines whether or not the address of the data written from the host 3 is already registered. If the address is unregistered, a new entry is created for the address. The address of the data in the virtual volume 1B and a pointer indicating the data stored in the pool area 1D are stored in the entry.

The pool area 1D is used successively. Unlike a journal volume, when writing is performed several times to the same address, the data are overwritten to the same location of the pool area 1D. The total size of the used storage areas within the entire storage area of the pool area 1D is equal to the total size of the range of the virtual volume 1B that is actually used (the range that is accessed by the host 3).

The first storage apparatus 1 monitors the total size of the data written in the pool area 1D, or in other words the usage amount of the pool area 1D (S3). When the usage amount of the pool area 1D reaches a preset, predetermined value, a search for available capacity is performed (S4). Available capacity indicates an unused storage area that is not assigned to any host 3.

The first storage apparatus 1 determines whether or not the second storage apparatus 2 comprises an unused storage area (the external volume 2B) having at least a predetermined size. The predetermined size is the total size of the data of the virtual volume 1B, which are stored in the pool area 1D. When the unused external volume 2B having at least the predetermined size is detected, the first storage apparatus 1 associates the external volume 2B with the externally connected volume 1E (S5). The processing used to associate the externally connected volume 1E with the external volume 2B and thus connect the two is known as mapping processing.

When mapping processing is complete, preparation of the externally connected volume 1E is completed, and the data stored in the pool area 1D are copied to the externally connected volume 1E (S6). The data copied to the externally connected volume 1E are transferred to the second storage apparatus 2 over the communication network, and stored in the external volume 2B. The connection of the LU 1A is then switched from the virtual volume 1B to the externally connected volume 1E. Thereafter, the host 3 accesses the externally connected volume 1E via the LU 1A, and performs data writing/reading to and from the externally connected volume 1E. Note that these processes are hidden from the host 3 so that the host 3 is able to perform data reading/writing while remaining unconscious of the actual data storage destination.

According to this embodiment, constituted as described above, the virtual volume 1B is defined as a non-physical entity, and only the range of the virtual volume 1B that is actually accessed is set in the pool area 1D. Hence, data reading/writing processing from and to the virtual volume 1B is possible using the pool area 1D, which is smaller in size than the virtual volume 1B. As a result, a larger volume can be constructed quickly, without adding a new storage device, and this larger volume can be provided to the host 3, enabling an improvement in the usability of the storage system.

In this embodiment, data from the host 3 are received by the virtual volume 1, which is not a physical entity, and when the data amount reaches a predetermined value, the data are transferred to the externally connected volume 1E. Hence, there is no need to provide a large number of storage devices in advance, and as a result, excessive prior investment can be prevented and the cost of the storage system can be reduced.

In this embodiment, the data of the virtual volume 1B are transferred from the pool area 1D to the externally connected volume 1E. Therefore, the external volume 2B existing on the exterior of the first storage apparatus 1 can be used, and thus the storage resources of the storage system can be used effectively. This embodiment will now be described in further detail.

FIRST EXAMPLE

Figure 2:
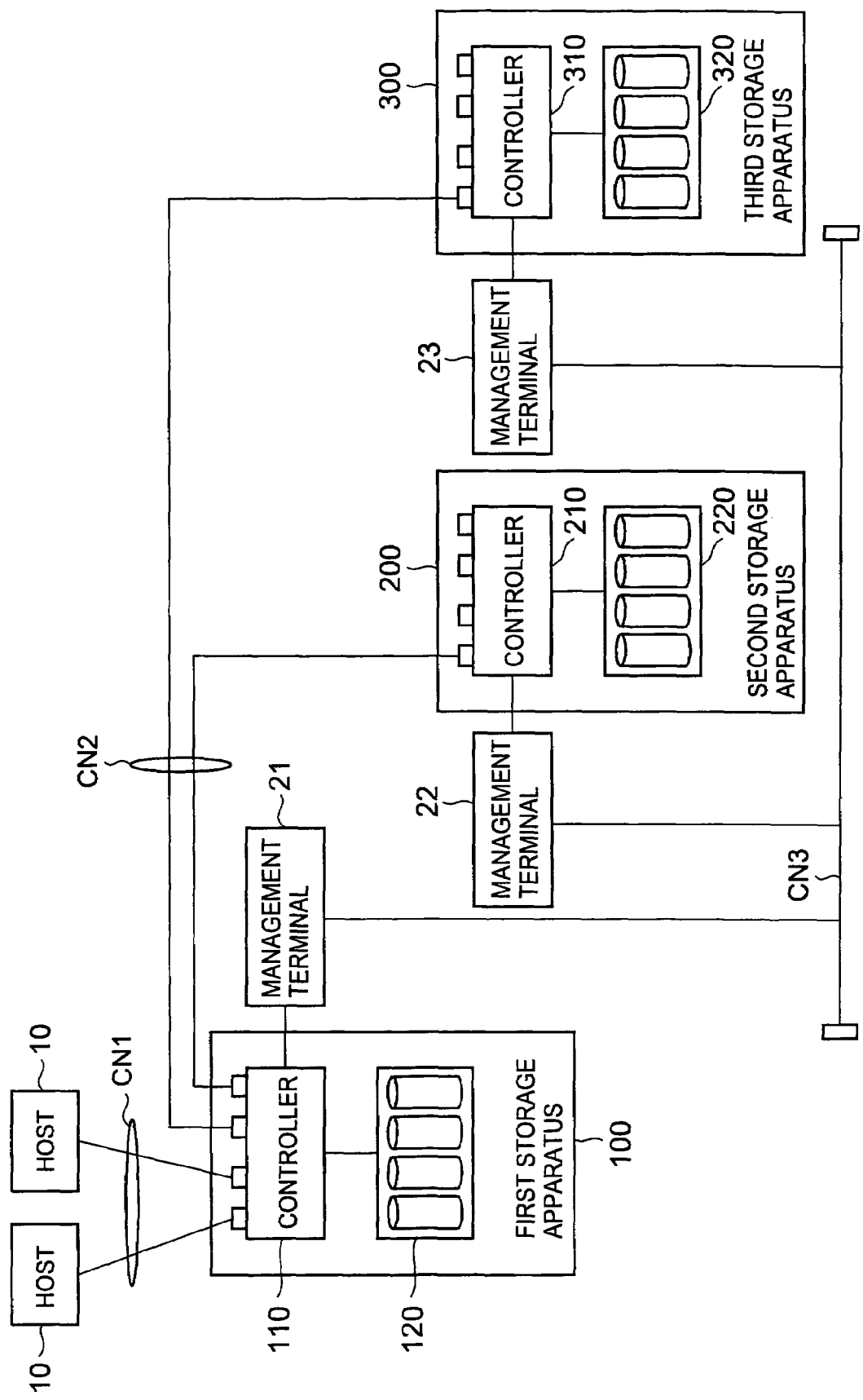
FIG. 2 is an illustrative view showing the overall constitution of a storage system.

FIG. 2 is an illustrative view showing the overall constitution of a storage system according to this example. First, the relationship of FIG. 2 to FIG. 1 will be clarified. A host 10, a first storage apparatus 100, and a second storage apparatus 200 correspond to the host 3 in FIG. 1, the first storage apparatus 1 in FIG. 1, and the second storage apparatus 200 (or third storage apparatus 300) in FIG. 1, respectively.

For example, this storage system may be constituted by at least one host 10, at least one first storage apparatus 100, at least one external storage apparatus 200, 300, and management terminals 21, 22, 23 connected respectively to the storage apparatuses 100, 200, 300. Note that the management terminals 21, 22, 23 do not have to be constituted individually, and instead, a single storage terminal may manage a plurality of storage apparatuses.

The host 10 is a computer apparatus comprising a CPU (Central Processing Unit) and information processing resources such as memory, for example. The computer apparatus may be a personal computer, a work station, a mainframe, or similar. The host 10 is connected to the first storage apparatus 100 via a communication network CN1 such as a SAN, for example.

The first storage apparatus 100 is a main storage apparatus which performs a central role in the storage system. The first storage apparatus 100 may be constituted by a controller 110 and a storage unit 120, as will be described in further detail below. The first storage apparatus 100 is connected to each host 10 via the communication network CN1. The first storage apparatus 100 is connected to the other storage apparatuses 200, 300 via a separate communication network CN2. A SAN or the like may be used as the separate communication network CN2, for example.

The second storage apparatus 200 and third storage apparatus 300 are both external storage apparatuses positioned on the exterior of the first storage apparatus 100. The second storage apparatus 200 is constituted by a controller 210 and a storage unit 220. Likewise, the third storage apparatus 300 is constituted by a controller 310 and a storage unit 320. The storage apparatuses 200, 300 are each capable of providing the first storage apparatus 100 with an internal actual volume, as will be described below.

The management terminal 21 is connected to the first storage apparatus 100, the management terminal 22 is connected to the second storage apparatus 200, and the management terminal 23 is connected to the third storage apparatus 300. The management terminals 21, 22, 23 are operated by a user such as a system manager. The management terminals 21, 22, 23 monitor the condition of the storage apparatuses to which they are respectively connected, and are capable of issuing required instructions thereto. The management terminals 21, 22, 23 are each constituted by a computer apparatus such as a personal computer or a portable information terminal, for example. The management terminals 21, 22, 23 are connected to each other via a communication network CN3 such as a LAN, for example. Hence the management terminals 21, 22, 23 can communicate with each other over the communication network CN3. Alternatively, the management terminals 21, 22, 23 may communicate with each other over the communication network CN2 between the storage apparatuses.

Figure 3:
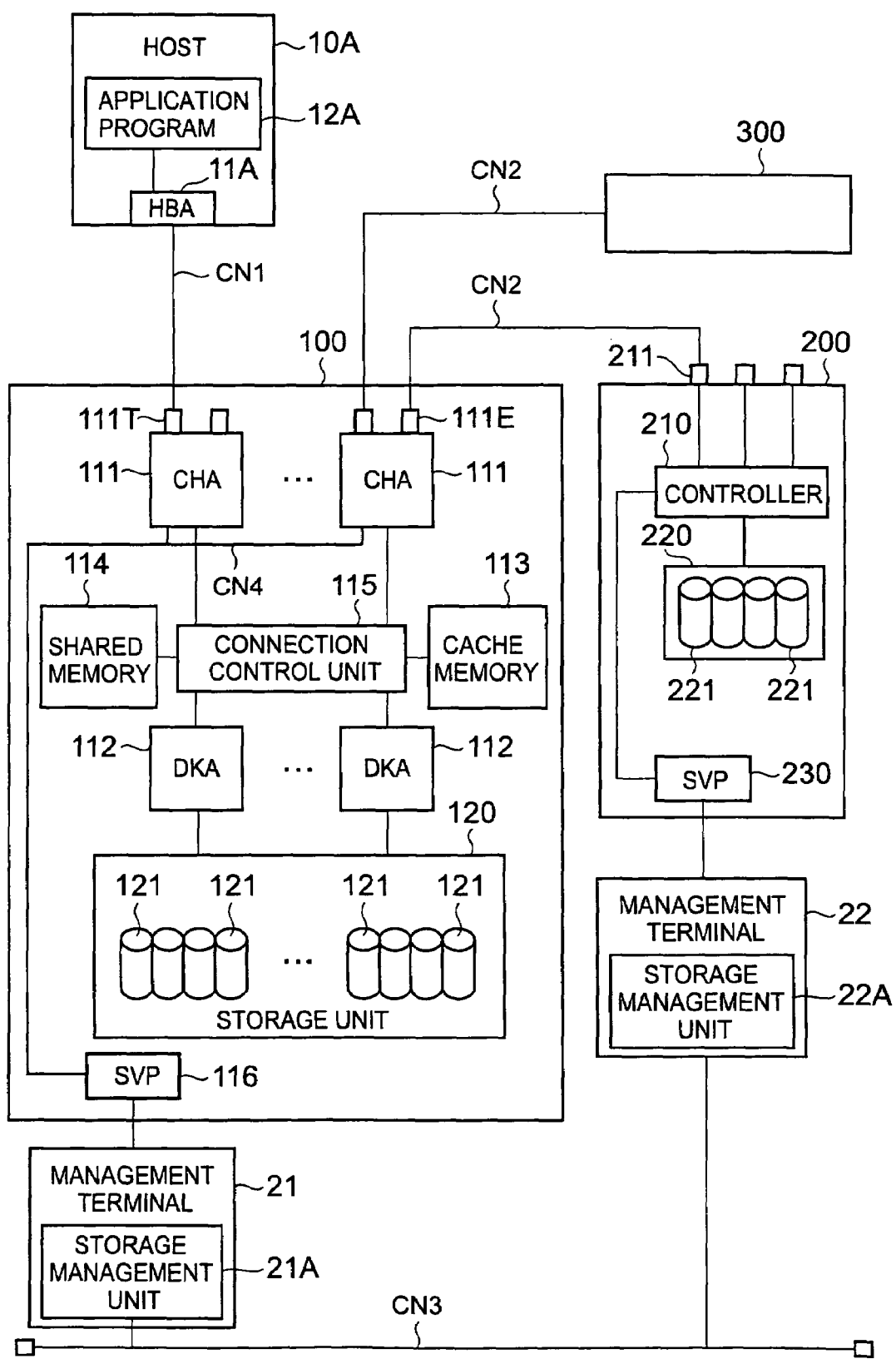
FIG. 3 is a block diagram of the storage system.

FIG. 3 is a block diagram of the storage system. For convenience, the drawing centers on the constitutions of the first storage apparatus 100 and second storage apparatus 200.

The host 10 may comprise an HBA (Host Bus Adapter) 11A for performing communication with the storage apparatus, and an application program 12A such as database software, for example. The host 10 may also be installed with path management software, storage management software, and so on, for example. When a plurality of paths is set between the host 10 and first storage apparatus 100, for example, the path management software performs load distribution, and controls path switching when an obstruction occurs. The storage management software is capable of instructing modifications to the constitution of the first storage apparatus 100, and so on.

The first storage apparatus 100 is configured as a disk array subsystem, for example. Note, however, that the present invention is not limited thereto, and the first storage apparatus 100 may be configured as a high performance intelligent switch. The first storage apparatus 100 is capable of using the storage resources of the external storage apparatuses 200, 300 as its own logical volume, and therefore does not require large-capacity storage devices. The first storage apparatus 100 need only comprise enough storage devices to realize the pool area.

As described above, the first storage apparatus 100 may be divided broadly into the controller 110 and the storage unit 120. The controller 110 comprises, for example, a plurality of channel adapters ("CHA" hereafter) 111, a plurality of disk adapters ("DKA" hereafter) 112, a cache memory 113, a shared memory 114, and a connection control unit 115.

Each CHA 111 performs data communication with the host 10. One or a plurality of the CHAs 111 comprises a communication port 111T for communicating with the host 10. Another one or plurality of the CHAs 111 comprises a communication port 111E for communicating with the external storage apparatuses 200, 300.

Each CHA 111 is configured as a microcomputer system comprising a CPU, memory, and so on, and serves to interpret and execute various commands received from the host 10. Each CHA 111 is assigned a network address (an IP address or WWN, for example) so that each CHA 111 can be identified. The CHAs 111 that are connected to the host 10 are each capable of behaving as an NAS (Network Attached Storage). When there is a plurality of hosts 10, the CHAs 111 receive and process requests from each host 10 individually.

Each DKA 112 transmits and receives data to and from disk drives 121 provided in the storage unit 120. Similarly to the CHAs 111, each DKA 112 is configured as a microcomputer system comprising a CPU, memory, and so on. For example, each DKA 112 writes data received by the CHA 111 from the host 10 to a predetermined address of a predetermined disk drive 121. Further, each DKA 112 reads data from a predetermined address in a predetermined disk drive 121, and transmits the data to the host 10 or external storage apparatuses 200, 300. When performing data input/output with the disk drive 121, the DKA 112 converts a logical address into a physical address. When the disk drives 121 are managed in accordance with a RAID, each DKA 112 performs data access corresponding to the RAID configuration. For example, the DKA 112 writes the same data to separate disk drive groups (RAID groups), or executes a parity calculation and writes the data and parity to the disk drive group.

The cache memory 113 stores data received from the host 10 or external storage apparatuses 200, 300, or data read from the disk drives 121.

The shared memory (also referred to as control memory) 114 stores various control information and the like required for use in an operation of the first storage apparatus 100. A work area is also set in the shared memory 114, and various types of tables, such as a mapping table to be described below, are also stored therein. The constitution of these tables will be described below. A table is created on the basis of an instruction from the management terminal 21, for example, and then stored in the shared memory 114. All or a part of the stored content of the table can be copied into the CHA 111 or DKA 112.

Note that any one or a plurality of the disk drives 121 may be used as a cache disk. Furthermore, the cache memory 113 and shared memory 114 may be constituted as individual memories, or a part of the storage area of a single memory may be used as a cache area, and the rest of the storage area may be used as a control area.

The connection control unit 115 connects the CHAs 111, DKAs 112, cache memory 113, and shared memory 114 to each other. The connection control unit 115 may be configured as a crossbar switch or a bus which performs data transfer by means of a high speed switching operation.

The storage unit 120 comprises the plurality of disk drives 121. Various storage devices and their equivalents, such as hard disk drives, flexible disk drives, magnetic tape drives, semiconductor memory drives, and optical disk drives, for example, may be used as the disk drives 121. Moreover, disks of different types, such as FC (Fibre Channel) disks and SATA (Serial AT Attachment) disks may be mixed together within the storage unit 120, for example.

A service processor (SVP) 116 serves to gather various information from within the first storage apparatus 100 via a communication network CN4 such as a LAN, for example, write control information to the shared memory 114, and so on. In the drawing, the SVP 116 is shown to be connected to each CHA 111, but the present invention is not limited thereto, and the SVP 116 may be connected to each CHA 111 and each DKA 112 via the communication network CN4.

The management terminal 21 is connected to the SVP 116 via a communication network such as a LAN, and comprises a storage management unit 21A. The storage management unit 21A is software for managing the storage apparatus. The management terminal 21 gathers various information from within the first storage apparatus 100 via the SVP 16, or gives various instructions to the first storage apparatus 100.

As described above, the second storage apparatus 200 comprises the controller 210 and storage unit 220. The second storage apparatus 200 is connected to the first storage apparatus 100 via a communication port 211. The second storage apparatus 200 may have a substantially identical constitution to that of the first storage apparatus 100, or a simpler constitution than that of the first storage apparatus 100. A plurality of disk drives 221 is provided in the storage unit 220 of the second storage apparatus 200. The physical storage area provided by each disk drive 221 may be handled as an internal storage area of the first storage apparatus 100.

The management terminal 22, similarly to the management terminal 21, is connected to the second storage apparatus 200 via a communication network such as a LAN, and comprises a storage management unit 22A. Note that the third storage apparatus 300 may be constituted identically to the second storage apparatus 200, and hence description thereof has been omitted.

Figure 4:
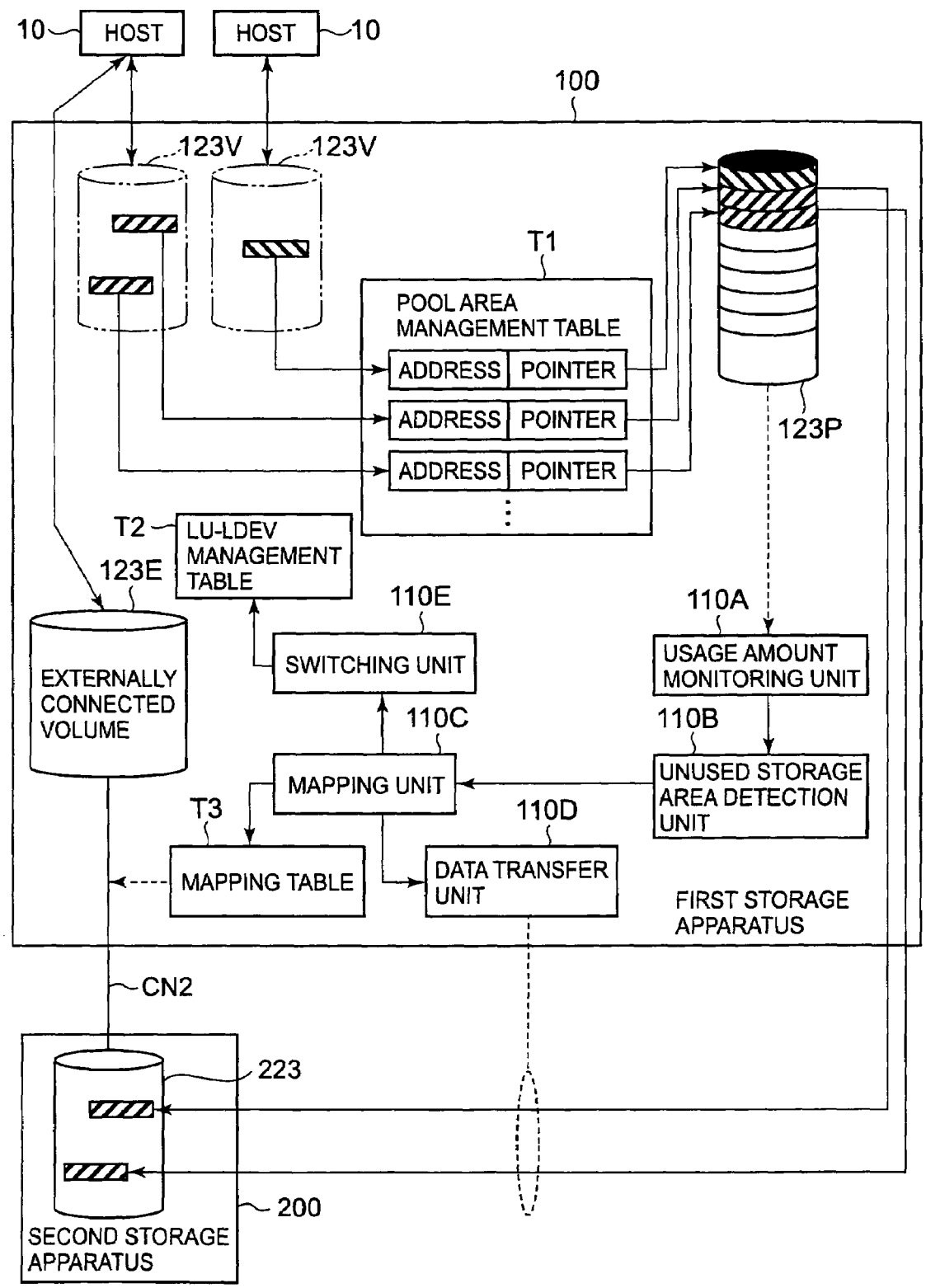
FIG. 4 is an illustrative view showing the main parts of the functional constitution of the storage system.

FIG. 4 is an illustrative view showing the functional constitution of the storage system. The first storage apparatus 100 may comprise one or a plurality of virtual volumes 123V, at least one pool area 123P, an externally connected volume 123E, a pool area management table T1, a usage amount monitoring unit 110A, an unused storage area detection unit 110B, a mapping unit 110C, a data transfer unit 110D, a switching unit 110E, an LU-LDEV management table T2, and a mapping table T3.

The virtual volumes 123V are not physical entities, but the host 10 is capable of accessing each virtual volume 123V without regard to the presence or absence of a physical entity. Each virtual volume 123V is associated with the pool area (which may also be referred to as a pool volume) 123P via the pool area management table T1.

The pool area 123P is an actual volume provided on a physical storage area that is provided by the storage unit 120 of the first storage apparatus 100. An actual volume denotes a volume that is a physical entity. Write data targeted at the virtual volumes 123V are stored successively in the pool area 123P. Accordingly, the size of each virtual volume 123V may be different from the size of the pool area 123P, and therefore the storage spaces of the two differ in structure. Note that the pool area 123P may be generated using the actual volumes of the external storage apparatuses 200, 300, similarly to the externally connected volume 123E. In this case, the first storage apparatus 100 need not comprise the storage unit 120.

The pool area management table T1 is control information for managing the relationship between the address of each virtual volume 123V and the addresses of the pool area 123P. A constitutional example of the pool area management table T1 will be described below.

The externally connected volume 123E is associated with an actual volume 223 provided in the external storage apparatus 200. Write data written to the externally connected volume 123E are stored in the volume 223 of the external storage apparatus 200. The externally connected volume 123E may be constituted in the same size as the external volume 223, and hence the storage spaces of the two may have an identical structure. Write data specifying a predetermined address of the externally connected volume 123E are stored at a corresponding address in the external volume. Note that in the drawing, the second storage apparatus 200 is illustrated as the external storage apparatus, but the present invention is not limited thereto, and a volume of the third storage apparatus 300 may be connected to the externally connected volume 123E.

The controller 110 of the first storage apparatus 100 realizes each of the functions 110A to 110E. The usage amount monitoring unit 110A monitors whether or not the data amount of the virtual volume 123V stored in the pool area 123P (the usage amount of the pool area 123P) has reached a predetermined value. Examples of the predetermined value include the defined size of the virtual volume 123V or a predetermined proportion of the defined size (for example, 70% of the defined size).

When the usage amount of the pool area 123P reaches the predetermined value, the unused storage area detection unit 110B determines whether or not the external storage apparatus 200 comprises an available volume 223 of at least a predetermined size. The predetermined size is a value that is equal to or greater than the entire data amount of the virtual volume 123V stored in the pool area 123P.

When the available volume 223 of the predetermined size is detected, the mapping unit 110C records the relationship between the available volume 223 and the externally connected volume 123E in the mapping table T3. As a result, the externally connected volume 123E is connected to the external volume 223. An example of the mapping table T3 will be described below.

The data transfer unit 110D reads all of the data relating to the virtual volume 123V that is subject to data transfer, from among all of the data stored in the pool area 123P, and stores the read data in the externally connected volume 123E. This copy processing is referred to as data transfer processing. As described above, the externally connected volume 123E takes physical form as the external volume 223, and therefore the data read from the pool area 123P are transferred to the second storage apparatus 200 over the communication network CN2, and written to a predetermined address of the external volume 223.

When the data transfer processing is complete, the switching unit 110E rewrites the LU-LDEV management table T2 so that the access destination device of the host 10 is switched from the virtual volume 123V to the externally connected volume 123E. An example of the LU-LDEV management table T2 will be described below.

Figure 5:
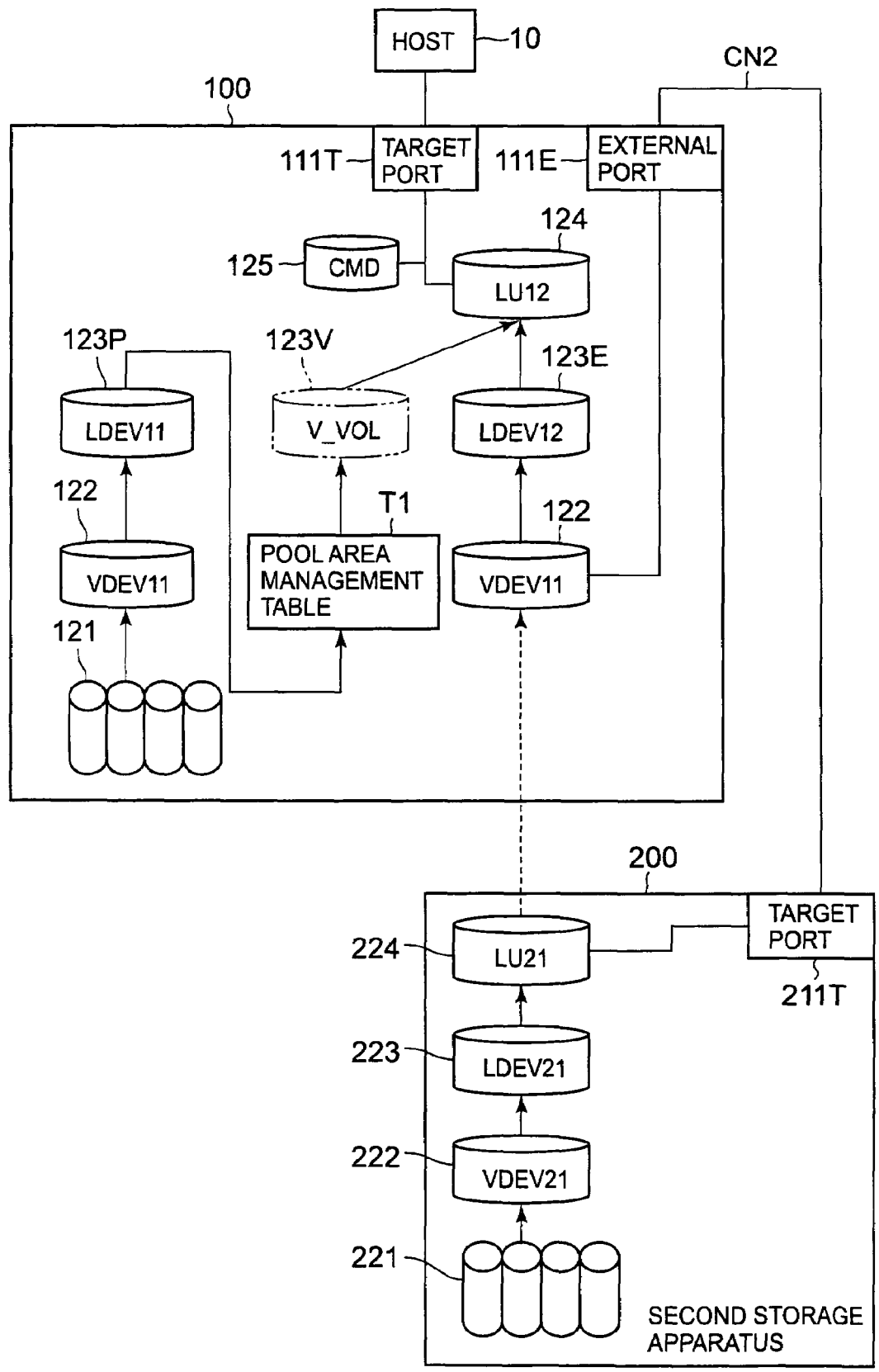
FIG. 5 is a pattern diagram showing the storage structure of the storage system.

FIG. 5 is a pattern diagram showing the storage structure of the storage system. The storage structure of the first storage apparatus 100 may be divided broadly into a physical storage hierarchy and a logical storage hierarchy, for example. The physical storage hierarchy is constituted by the disk drives 121, which are physical disks.

The logical storage hierarchy may be constituted by a plurality (two, for example) hierarchies. One logical hierarchy is a VDEV (Virtual Device) 122, and the other logical hierarchy is an LDEV (Logical Device) 123.

The VDEV 122 is constituted by grouping together a predetermined number of the disk drives 121 in fours (3D+1P), eights (7D+1P), or similar. The storage areas provided by each of the disk drives 121 belonging to the group collectively form a single RAID storage area. The RAID storage area is the VDEV 122.

On the other hand, since not all of the VDEVs 122 are generated directly on a physical storage area, at least a part of the VDEVs 122 may be configured as virtual intermediate storage devices. The VDEV 122 shown on the right hand side of the drawing serves as a receiver for mapping an LU (Logical Unit) 224 of the second storage apparatus 200.

The LDEV 123 is a logical volume, at least one or more of which can be provided on each of the VDEVs 122. The LDEV 123 may be constituted by dividing the VDEVs 122 at fixed lengths, for example. When the host 10 is an open host, the LDEV 123 is mapped to the LU 124, and thus the host 10 recognizes the LDEV 123 as a single physical disk. An open host accesses the desired LDEV 123 by specifying an LUN (Logical Unit Number) or a logical block address. Note that in the case of a mainframe host, the LDEV 123 is recognized directly.

The virtual volume 123V (illustrated as "V-VOL" in FIG. 5) of the LDEV 123 is related to the pool area 123P via the pool area management table T1. As noted above, the pool area 123P is provided on the storage area of the disk drives 121. Further, the externally connected volume 123E of the LDEV 123 is related to an LDEV 223 of the second storage apparatus 200 via the virtual intermediate storage device VDEV.

The LU 124 is a device that can be recognized as an SCSI logical unit. The LU 124 is connected to the host 10 via the target port 111T. At least one or more of the LDEVs 123 may be related respectively to the LU 124. By relating a plurality of the LDEVs 123 to the single LU 124, the LU size can be virtually expanded.

A CMD (Command Device) 125 is a dedicated LU used to transfer a command or status between an I/O control program which runs on the host 10 and the controller 110 (CHA 111, DKA 112) of the storage apparatus 100. A command from the host 10 is written to the CMD 125. The controller 110 of the storage apparatus 100 executes processing corresponding to the command written in the CMD 125, and writes the execution result to the CMD 125 as a status. The host 10 reads and confirms the status written in the CMD 125, and then writes the content of the processing to be executed next to the CMD 125. Thus the host 10 can give various instructions to the storage apparatus 100 via the CMD 125.

Note that a command received from the host 10 may be processed without being stored in the CMD 125. Further, for example, the CHA 111 may write a command received from the host 10 to the shared memory 114, the CHA 111 or DKA 112 may process the command stored in the shared memory 114 and write the processing result to the shared memory 114, and then the processing result may be transmitted from the CHA 111 to the host 10.

Incidentally, the second storage apparatus 200 is connected to an external connection initiator port (External Port) 111E of the first storage apparatus 100 via the communication network CN2. The second storage apparatus 200 comprises a plurality of disk drives 221, a VDEV 222 set on the storage area provided by the disk drives 221, and LDEVs 223, at least one or more of which can be set on the VDEV 222. The LDEV 223 is related to the LU 224. The LDEV 223 of the second storage apparatus 200 is related to the externally connected volume 123E, and provides the externally connected volume 123E with a physical storage area.

FIG. 6 is an illustrative view showing an example of the pool area management table T1. The pool area management table T1 may be constituted by associating an entry number, an LU number, a logical address (LBA), a data length, and a pointer, for example.

Here, the entry number is information indicating the sequence in which the storage areas in the pool area 123P are secured. The LU number is information for identifying the LU 124. The LBA is information indicating the storage destination address of the data in the virtual volume 123V. The data length is information indicating the length of these data. The pointer is information indicating the actual storage position of the data in the pool area 123P. Thus the pool area management table T1 is able to manage the plurality of virtual volumes 123V and the single pool area 123P in association. Entries are added to the pool area management table T1 in the order in which data are written to the virtual volume 123V, and each entry is associated with a pointer indicating the actual storage destination of the data. When data writing is performed a second time in relation to a pre-existing entry, the pre-existing data are overwritten. Only one entry is created for the same address in the virtual volume 123V.

Figure 7A:
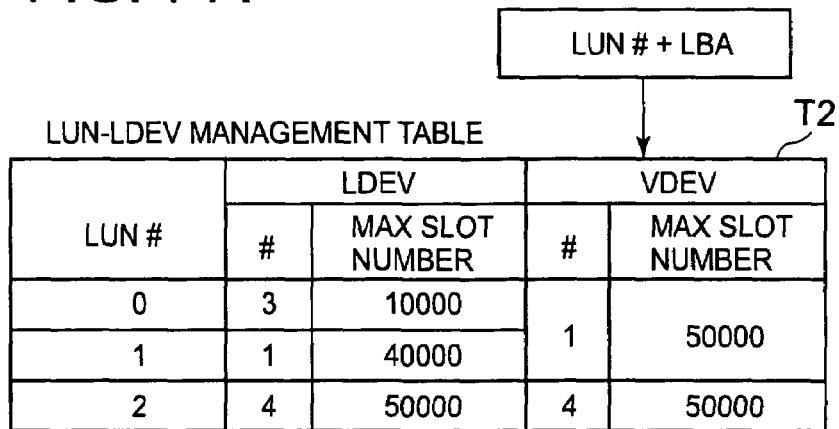
FIG. 7 is an illustrative view showing a LUN-LDEV management table and a mapping table, (a) showing the LUN-LDEV management table, (b) showing the mapping table, and (c) showing another example of the mapping table.
Figure 7B:
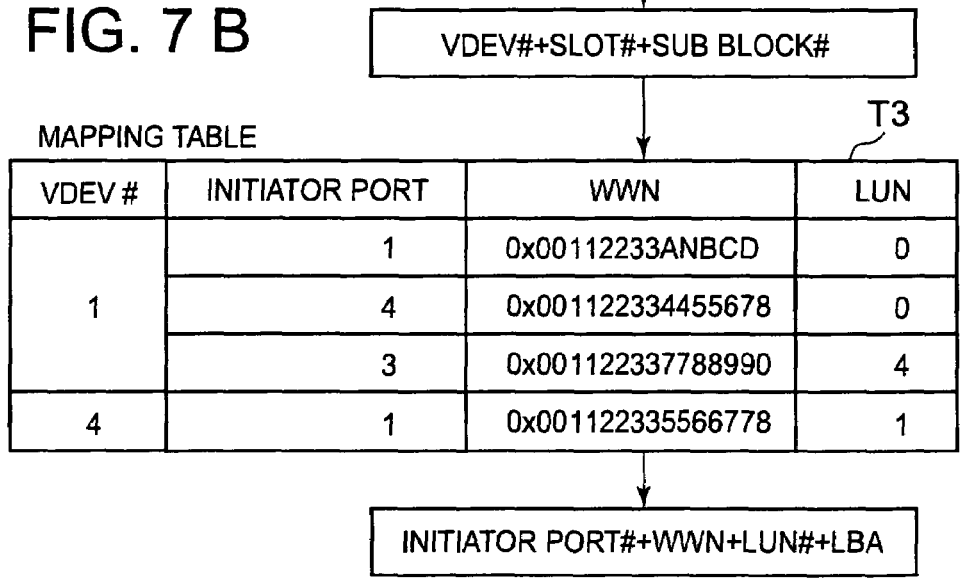

FIG. 7 illustrates the LUN-LDEV management table T2 and mapping table T3. The LUN-LDEV management table T2 may be constituted by associating an LU number, an LDEV number, and a VDEV number, for example. Note that a table may be provided for conversely extracting the LDEV number and LU number from the VDEV number.

The mapping table T3 may be constituted by associating the VDEV number, a port number, and path information for accessing the external volume 223, for example. Examples of the path information include a WWN or an LU number.

Next, an example of the use of the tables T2, T3 will be described. The host 10 transmits write data, notifying the communication port 111T of the LU number (LUN#) and logical block address (LBA). The first storage apparatus 100 converts the address (LUN#+LBA) of the write data to a VDEV address on the basis of the table T2. By referring to the table T2, the data (LUN#+LBA) from the host 10 are converted into VDEV data (VDEV#+SLOT#+SUB-BLOCK#).

Next, the first storage apparatus 100 refers to the table T3 to convert the VDEV data into data to be transmitted to and stored in the LUN of the second storage apparatus 200. The port number in the table T3 is information identifying the initiator port for transmitting the write data to the second storage apparatus 200. The WWN in the table T3 is information specifying the data transfer destination communication port 211, and the LU number is information identifying the LU 224 that can be accessed through the communication port 211 of the second storage apparatus 200.

Thus the first storage apparatus 100 converts the address information of the data to be stored into an initiator port number#+WWN+LUN#+LBA format. The data having their address information thus modified are transmitted over the communication network CN2 from the specified initiator port to the specified communication port 211. The data are then stored in a predetermined location of the specified LDEV 223.

Figure 7C:
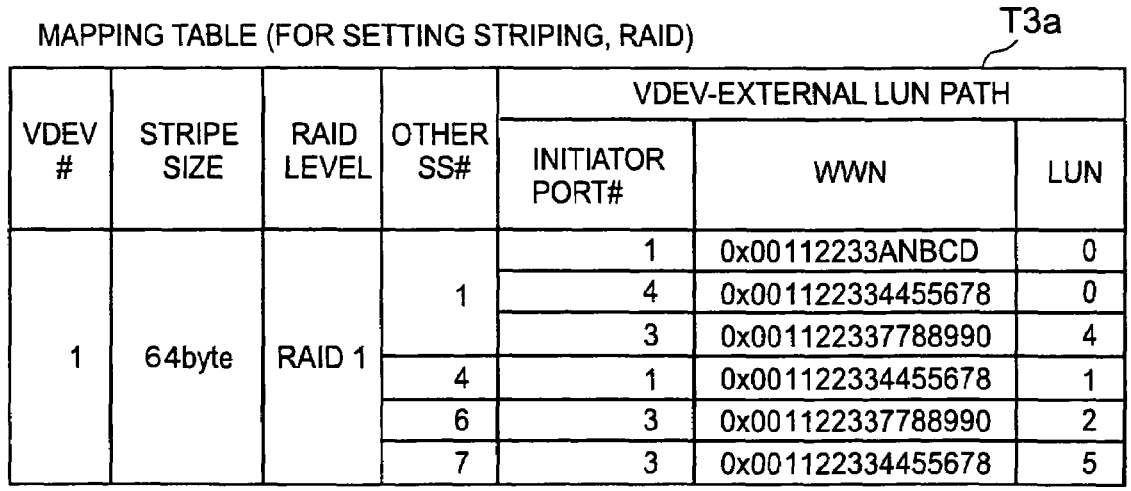

FIG. 7C shows another example of the mapping table T3. This conversion table T3a is used when striping or a RAID is applied to the VDEV related to the external disk drives 221. The table T3a may be constituted by associating the VDEV number (VDEV#), the stripe size, the RAID level, a number identifying the second storage apparatus 200 (SS# (apparatus number)), the initiator port number, and the WWN and LU number of the communication port 211, for example.

In the example shown in FIG. 7C, a single VDEV (V-VOL) constitutes RAID-1 using a total of four external storage apparatuses specified by their SS# (1, 4, 6, 7). Three LUs (#0, #0, #4) assigned to the SS#1 are set in the same device (VDEV#). Note that the volume of the LUN#0 has an alternate path structure with two access data paths. Thus the logical volumes (LDEVs) provided in each of the plurality of external storage apparatuses are mapped respectively in a single VDEV in the first storage apparatus 100, and can be used as the externally connected volume 123E. Hence in this example, a VDEV is constituted by a plurality of external logical volumes (LDEV), and thus the VDEV can be used with the addition of functions such as striping and RAID.

Figure 8:
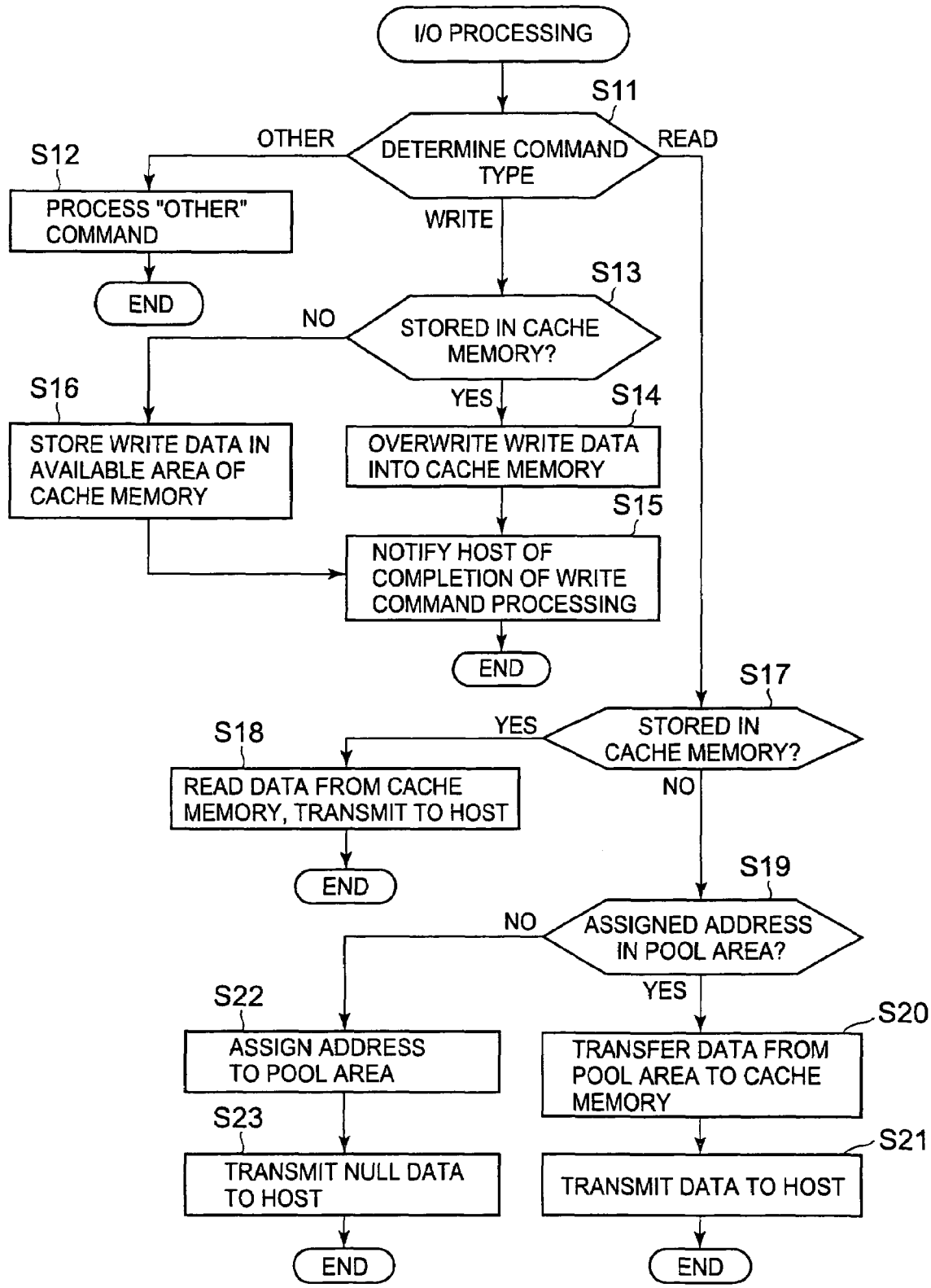
FIG. 8 is a flowchart for processing an access request from a host.

FIG. 8 is a flowchart illustrating overall processing for inputting and outputting data to and out of the virtual volume 123V. This processing can be executed by the controller 110 of the first storage apparatus 100. Note that the flowchart and the following description illustrate the main parts of the processing, and differ from an actual program.

Upon reception of a command issued by the host 10, the first storage apparatus 100 determines the command type (S11). When the command is neither a read command nor a write command, for example a status inquiry command or the like, the first storage apparatus 100 executes processing corresponding to the command (S12). In the case of a status inquiry command, for example, the status about which the inquiry was made is transmitted back to the host 10.

When the command received from the host 10 is a write command, the first storage apparatus 100 determines whether or not the write data to be written in accordance with the write command are stored in the cache memory 113 (S13). When the write data are already written in the cache memory 113 (S13; YES), the first storage apparatus 100 overwrites the data stored in the cache memory 113 with the write data received from the host 10 (S14), and notifies the host 10 that writing is complete (s15). Conversely, when the write data are not stored in the cache memory 113 (S13: NO), the first storage apparatus 100 stores the write data received from the host 10 in an available area of the cache memory 113 (S16). Hence, when a write command is received from the host 10, the host 10 is informed that processing of the write command is complete when the write data are stored in the cache memory 113. The write data stored in the cache memory 113 are stored in a physical storage area at an appropriate timing, taking into consideration the load condition of the first storage apparatus 100 and so on.

On the other hand, when the command received from the host 10 is a read command, the first storage apparatus 100 determines whether or not the data requested by the read command are already stored in the cache memory 113 (S17). When the data requested by the host 10 are stored in the cache memory 113 (S17: YES), the first storage apparatus 100 read the data from the cache memory 113 and transmit the read data to the host 10 (S18).

When the data requested by the host 10 are not stored in the cache memory 113 (S17: NO), the first storage apparatus 100 determines whether or not the address of the requested data corresponds to an address assigned to the pool area 123P (S19). When the address of the data (i.e. an address in the storage space of the virtual volume 123V) has already been assigned to the pool storage area 123P (S19: YES), the first storage apparatus 100 obtains the pointer corresponding to the data by referring to the pool area management table T1. The first storage apparatus 100 then reads the data from the pool area 123P on the basis of the pointer, and stores the data in the cache memory 113 (S20). The first storage apparatus 100 then reads the data stored in the cache memory 113 and transmits the read data to the host 10 (S21).

If, on the other hand, the address of the data requested by the host 10 has not yet been assigned to the pool area 123P (S19: NO), the first storage apparatus 100 assigns the address to the pool area 123P (S22). More specifically, the first storage apparatus 100 adds a new entry to the pool area management table T1, records the requested address in the entry, and associates the address with a pointer indicating the area assigned to the address. The first storage apparatus 100 then transmits null data to the host 10 (S23).

Figure 9:
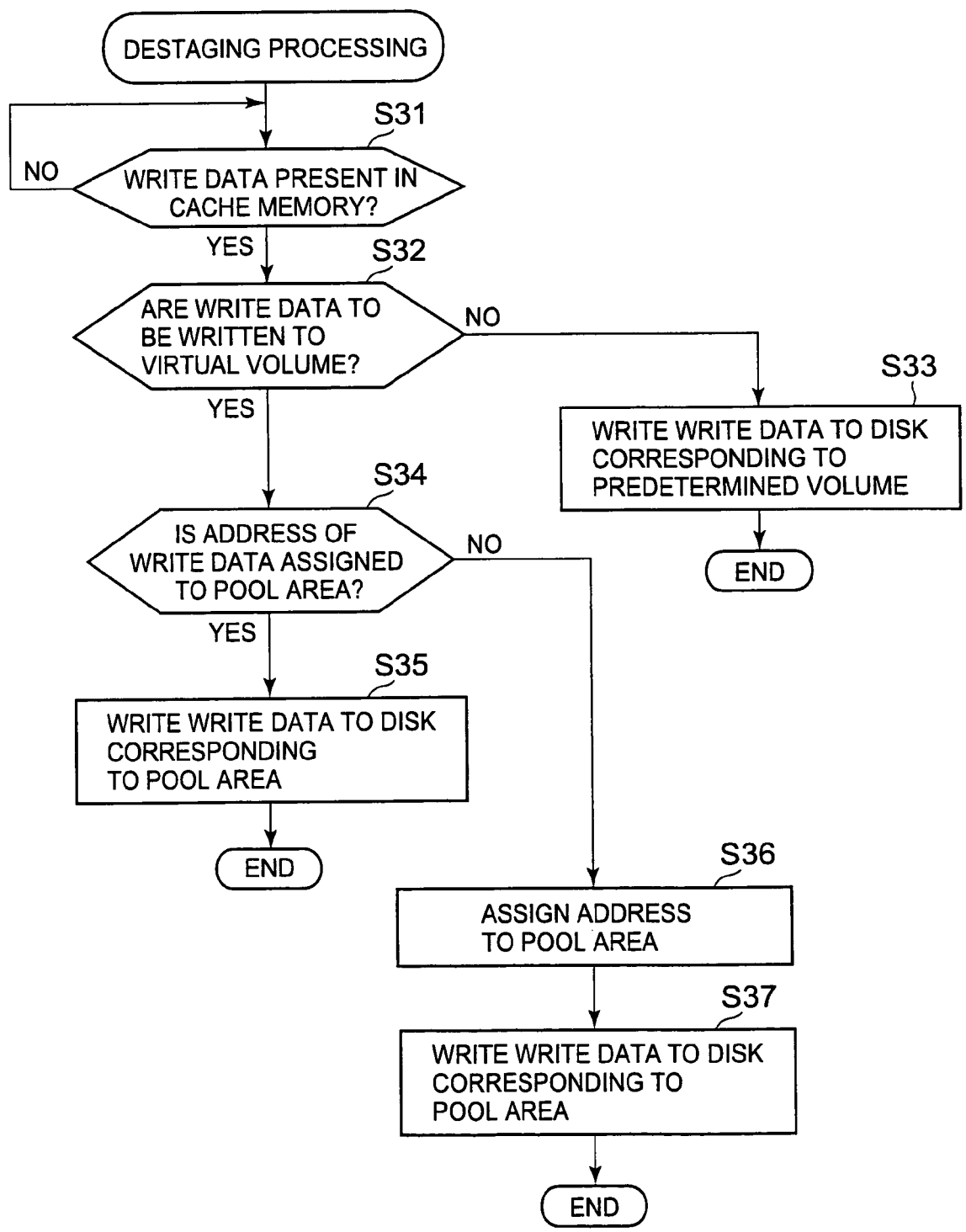
FIG. 9 is a flowchart illustrating destaging processing.

FIG. 9 is a flowchart illustrating processing for writing write data stored in the cache memory 113 to a volume. This processing can be executed by the controller 110 (in particular, the DKA 112) of the first storage apparatus 100.

Write data stored in the cache memory 113 but not yet written to a volume are known as dirty data. Write data that are already written to a volume are known as clean data.

Upon the discovery of dirty data stored in the cache memory 113 (S31: YES), the first storage apparatus 100 determines, based on the address of the dirty data, whether or not the dirty data are write data to be written to the virtual volume 123V (S32). When the write data are targeted at a normal-volume other than the virtual volume 123V (S32: YES$^i$), the first storage apparatus 100 stores the write data in the disk drive 121 constituting the specified volume (S33).

On the other hand, when the virtual volume 123V is the writing destination of the write data (S32: YES), the first storage apparatus 100 determines whether or not the address of the write data has already been assigned to the pool area 123P (S34). When the address of the write data has already been assigned to the pool area 123P (S34: YES), the first storage apparatus 100 stores the write data in the disk drive 121 corresponding to the pool area 123P (S35).

When the address of the write data to be written to the virtual volume 123V has not yet been assigned to the pool area 123P (S34: NO), the first storage apparatus 100 assigns the address to the pool area 123P (S36). The first storage apparatus 100 then stores the write data in the disk drive 121 corresponding to the pool area 123P (S37).

Figure 10:
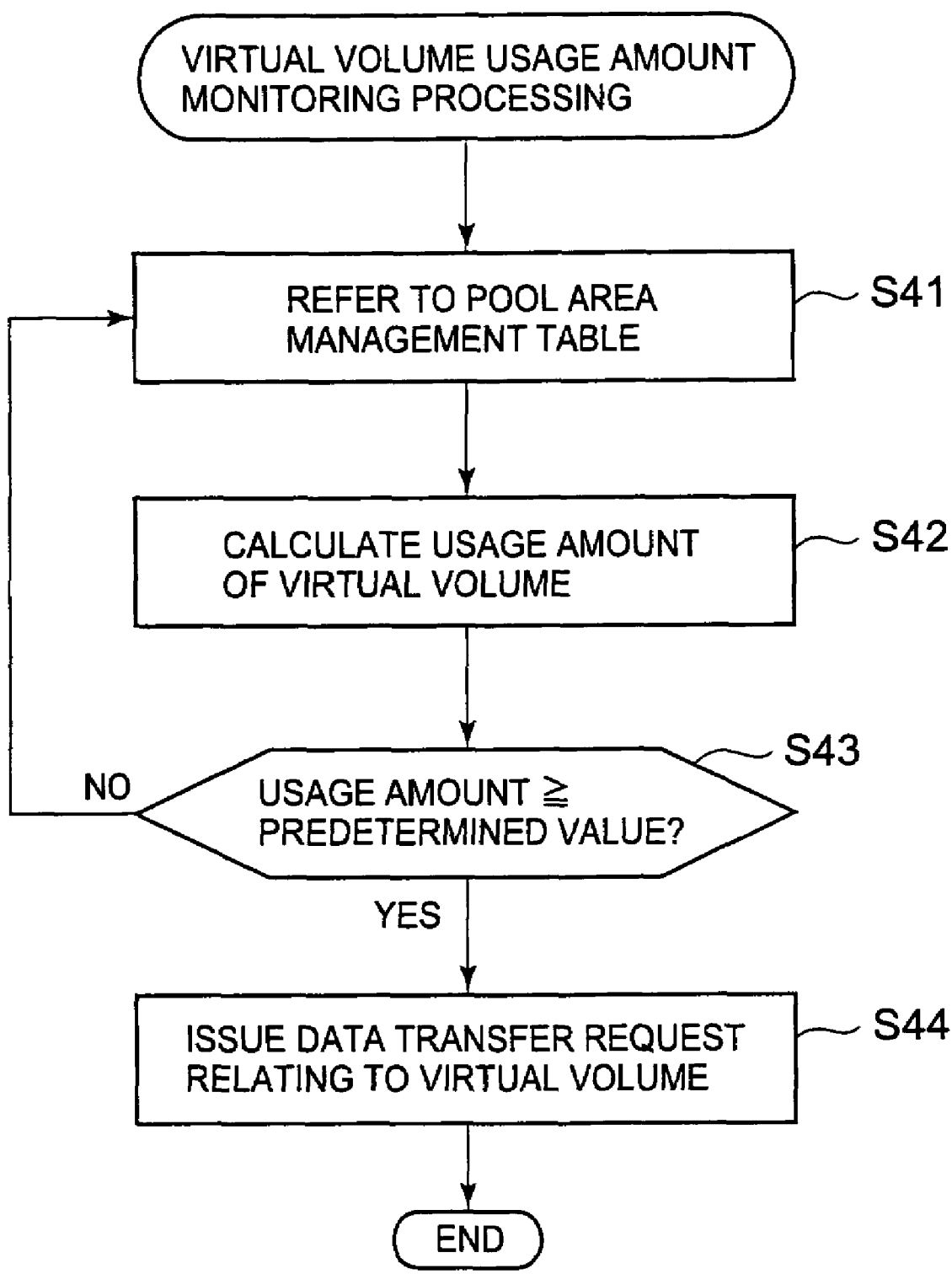
FIG. 10 is a flowchart illustrating processing for monitoring the usage amount of a virtual volume.

FIG. 10 is a flowchart illustrating processing for monitoring the usage amount of the virtual volume 123V (the usage amount of the virtual volume 123V in the pool area 123P). This processing can be executed by the controller 110 of the first storage apparatus 100 or the management terminal 21, for example. Here, it is assumed that the processing is executed by the controller 110 of the first storage apparatus 100.

The first storage apparatus 100 refers to the pool area management table T1 (S41) to calculate the usage amount of each virtual volume 123V (S42). More specifically, the usage amount can be calculated by totaling the respective data lengths of the write data corresponding to the LU number of each virtual volume 123V.

Next, the first storage apparatus 100' compares the calculated usage amount to a preset, predetermined value (S43). The predetermined value may be set as the defined size (maximum size) of the virtual volume 123V, or a value corresponding to a predetermined proportion of the defined size, for example. The predetermined value may be set freely by the user.

If the usage amount has not reached the predetermined value (S43: NO), the first storage apparatus 100 returns to S41 to continue monitoring. If the usage amount has reached the predetermined value (S43: YES), the first storage apparatus 100 issues a data transfer request relating to the virtual volume 123V (S44).

Figure 11:
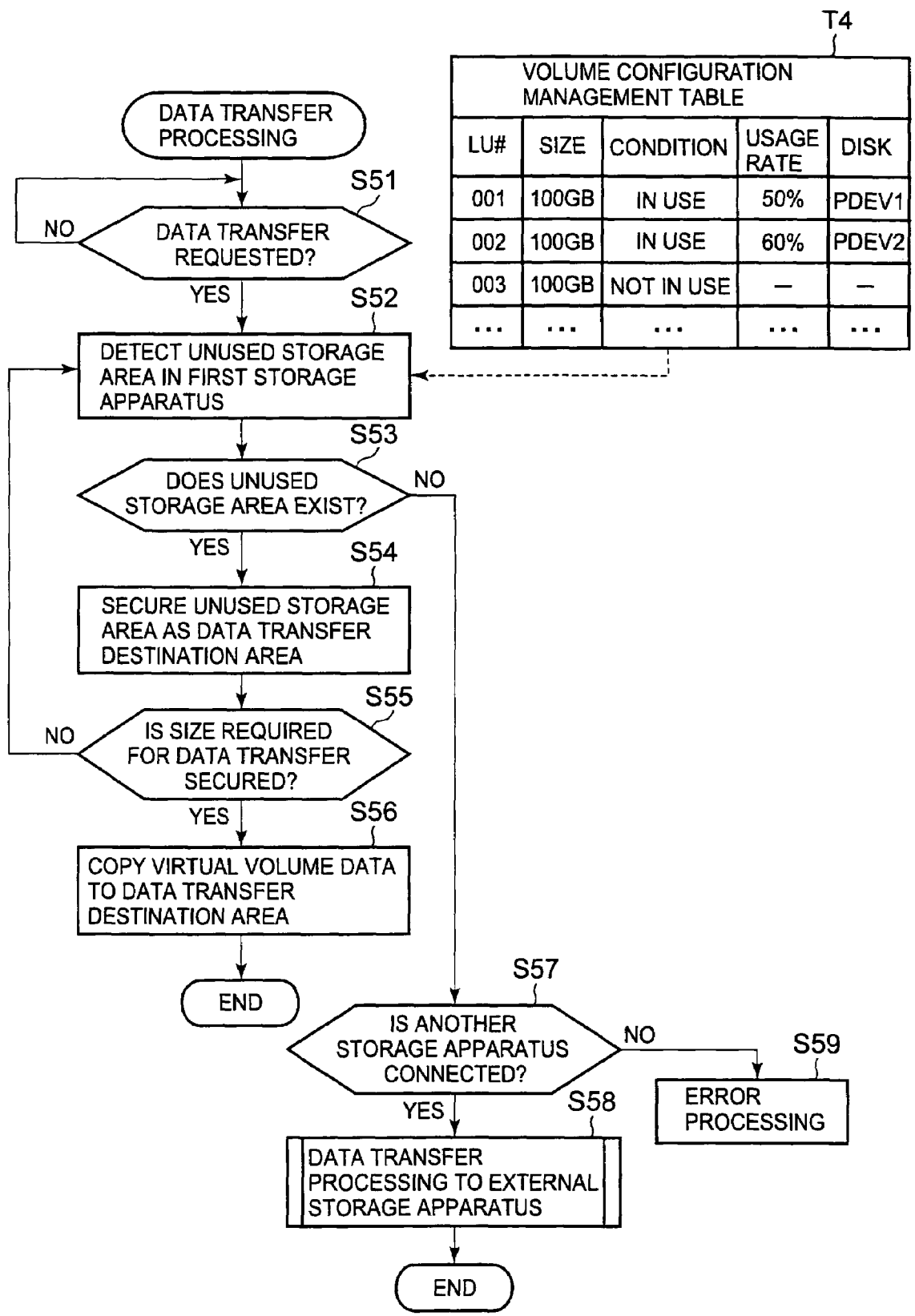
FIG. 11 is a flowchart illustrating data transfer processing.

FIG. 11 is a flowchart illustrating data transfer processing. This processing can be executed by the controller 110 of the first storage apparatus 100 or the management terminal 21, for example. Here, it is assumed that the processing is executed by the controller 110 of the first storage apparatus 100. The first storage apparatus 100 determines whether or not a data transfer request has been issued (S51).

If a data transfer request has been issued (S51: YES), the first storage apparatus 100 detects an unused storage area in the first storage apparatus 100 by referring to a volume configuration management table T4, for example (S52).

The volume configuration management table T4 may be constituted by associating the LU number, a volume size, a usage condition, a usage rate (usage amount), the drive number of the corresponding disk drive 121, and so on, for example. The first storage apparatus 100 can learn the usage condition of the storage areas in the first storage apparatus 100 using the volume configuration management table T4.

The first storage apparatus 100 determines whether or not an unused storage area exists within the storage unit 120 of the first storage apparatus 100 (S53). More specifically, the first storage apparatus 100 determines whether or not an unused storage area that is not assigned to any of the hosts 10 exists within the first storage apparatus 100.

When an unused storage area exists in the storage unit 120 (S53: YES), the first storage apparatus 100 secures the unused storage area as a data transfer destination storage area (S54). The first storage apparatus 100 then determines whether or not an unused area having a predetermined size that is sufficient for transfer of the data of the virtual volume 123V has been secured (S55). If the unused area has not reached the predetermined size (S55: NO), the processing returns to S52, where another unused storage area is detected and secured. When an unused storage area of the predetermined size has been secured (S55: YES), the first storage apparatus 100 generates a data transfer destination volume on the basis of the secured unused storage area, and copies the data of the virtual volume 123V, stored in the pool area 123P, to this volume (S56).

Incidentally, when no unused storage areas exist in the first storage apparatus 100 (S53: NO), the data of the virtual volume 123V cannot be copied to an actual volume in the first storage apparatus 100. Although omitted from the flowchart, when no unused storage area of the predetermined size or greater exists in the first storage apparatus 100, the processing advances to S57.

The first storage apparatus 100 then determines whether or not any other storage apparatuses are connected to the first storage apparatus 100 (S57). When another storage apparatus (the storage apparatuses 200, 300, for example) is connected to the first storage apparatus 100 (S57: YES), data transfer processing to the external storage apparatus is performed (S58). Data transfer processing to an external storage apparatus will be described below. When no other storage apparatuses are connected to the first storage apparatus 100 (S57: NO), a data transfer destination storage area cannot be secured in the storage system. In this case, error processing is performed (S59). In this error processing, the user is informed of an error message such as "Insufficient storage area. Add a disk drive" via the screen of the management terminal 21, for example.

Figure 12:
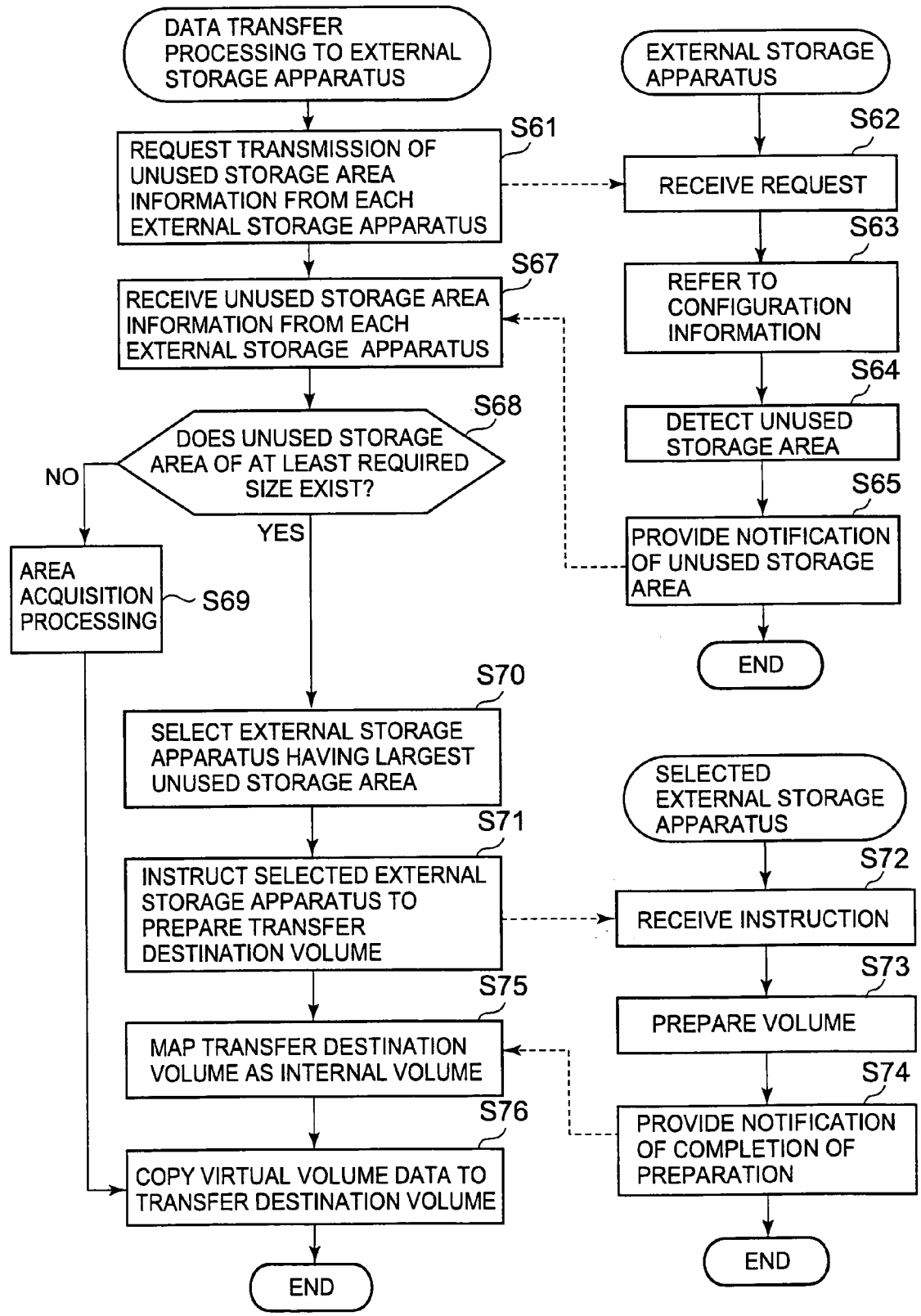
FIG. 12 is a flowchart illustrating data transfer processing to an external storage apparatus.

FIG. 12 is a flowchart illustrating data transfer processing to an external storage apparatus. This processing corresponds to S58 in FIG. 11. This processing can be executed by the controller 110 of the first storage apparatus 100 or the management terminal 21, for example. Here, it is assumed that the processing is executed by the management terminal 21.

The management terminal 21 (also referred to as the first management terminal 21) connected to the first storage apparatus 100 issues a request to each of the external storage apparatuses 200, 300 connected to the first storage apparatus 100 to transmit information relating to unused storage areas (S61). More specifically, an inquiry regarding unused storage areas is sent to the management terminals 22, 23 connected to the respective external storage apparatuses 200, 300 over the communication network CN3 from the management terminal 21 connected to the first storage apparatus 100.

The management terminal 22 (also referred to as the second management terminal 22) connected to the second storage apparatus 200 and the management terminal 23 (also referred to as the third management terminal 23) connected to the third storage apparatus 300 each execute the following processing in relation to the inquiry. In this example, the second management terminal 22 is used.

Upon reception of the request from the first management terminal 21 (S62), the second management terminal 22 refers to configuration information (S63) to detect an unused storage area in the second storage apparatus 200 (S64). The second management terminal 22 then informs the first management terminal 21 of the unused storage areas in the second storage apparatus 200 (S65). Likewise, the third management terminal 23 detects unused storage areas in the third storage apparatus 300 and informs the first management terminal 21 thereof.

Upon reception of the unused storage area information from the management terminals 22, 23 (S67), the first management terminal 21 determines whether or not an unused storage area of the predetermined size or greater exists in either of the external storage apparatuses 200, 300 (S68).

When the external storage apparatuses 200, 300 do not comprise an unused storage area of the predetermined size or greater (S68: NO), area acquisition processing, to be described below, is performed (S69). When an unused storage area of the predetermined size or greater exists in at least one of the external storage apparatuses 200, 300 (S68: YES), the first management terminal 21 selects the external storage apparatus having the largest unused storage area (S70). Here, it is assumed for convenience of description that the second storage apparatus 200 is selected.

Next, the first management terminal 21 instructs the second management terminal 22 of the selected second storage apparatus 200 to prepare a volume to serve as the data transfer destination (S71). Upon reception of the instruction from the first management terminal 21 (S72), the second management terminal 22 prepares a volume having the specified size, and sets the required paths and so on (S73). Having completed preparation of the data transfer destination volume, or in other words the copy destination volume 223, the second management terminal 22 notifies the first management terminal 21 that the preparation is complete (S74).

Upon reception of this notification from the second management terminal 22, the first management terminal 21 connects the volume 223 prepared in the second storage apparatus 200 to the externally connected volume 123E so that the volume 223 can be used as if it were an internal volume of the first storage apparatus 100 (S75). The first management terminal 21 then issues an instruction to the controller 110 of the first storage apparatus 100 to copy the data of the virtual volume 123V, stored in the pool area 123P, to the externally connected volume 123E (S76).

More specifically, the data are read from the disk drive 121 corresponding to the pool area 123P, and the read data are transmitted to the second storage apparatus 200 over the communication network CN2. The data are then stored in cache memory provided in the controller 210 of the second storage apparatus 200. The data stored in the cache memory are stored in the disk drive 221 corresponding to the external volume 223 at an appropriate timing.

Figure 13:
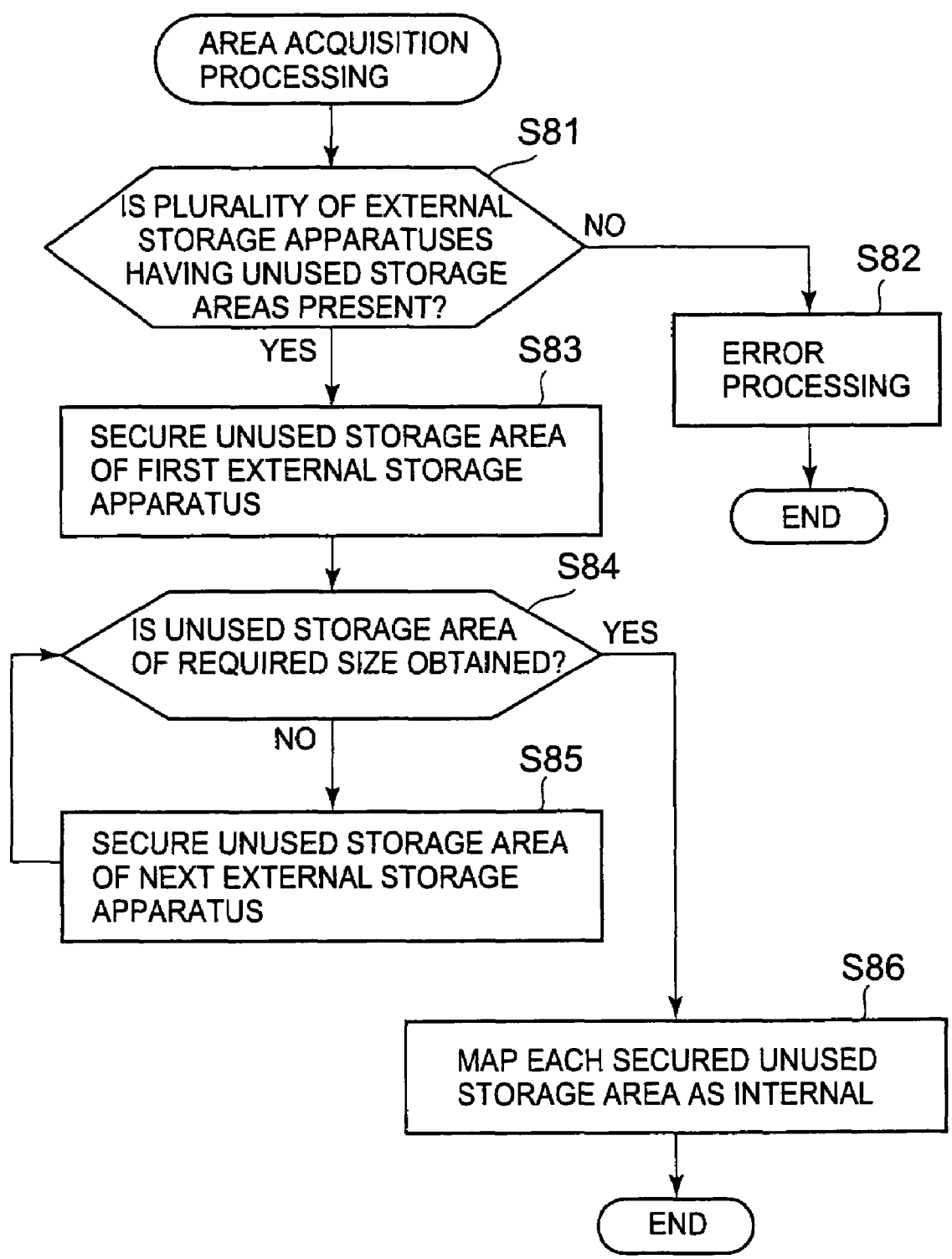
FIG. 13 is a flowchart illustrating area acquisition processing.

FIG. 13 is a flowchart illustrating area acquisition processing. This processing corresponds to S69 in FIG. 12. The processing can be executed by either the controller 110 of the first storage apparatus 100 or the first management terminal 21. Here, it is assumed that the processing is executed by the first management terminal 21.

The first management terminal 21 determines, on the basis of information received from the management terminals 22, 33, whether or not an unused storage area exists in the external storage apparatuses 200, 300 (S81). When no unused storage area exists in either of the external storage apparatuses 200, 300 (S81: NO), a data transfer destination volume cannot be secured, and therefore the first management terminal 21 executes error processing (S82). In this error processing, a message indicating the lack of an unused storage area is displayed on the screen of the first management terminal 21, for example.

When an unused storage area exists in the external storage apparatuses 200, 300 (S81: YES), the first management terminal 21 secures the unused storage area in the first external storage apparatus (S83). For example, the first management terminal 21 secures the unused storage areas in order of an apparatus number identifying each storage apparatus. It is assumed here that the unused storage area of the second storage apparatus 200 is secured first as the data transfer destination storage area.

The first management terminal 21 determines whether or not the secured unused storage area has a sufficient size (predetermined size) to transfer the data of the virtual volume 123V (S84). When the size of the secured unused storage area does not reach the predetermined size (S84: NO), the first management terminal 21 secures the unused storage area of the next external storage apparatus (here, the third storage apparatus 300) (S85). Thus the first management terminal 21 secures unused storage areas distributed throughout the storage system to correspond to the predetermined size.

Next, the first management terminal 21 maps the unused storage areas secured respectively in the storage apparatuses 200, 300 to the intermediate storage device (VDEV) 122, and connects the secured unused storage areas to the externally connected volume 123E (S86).

According to this example, as described in detail above, only the range of the virtual volume 123V that is actually accessed is used successively within the pool area 123P. Hence, volume assignment requests from the host 10 can be dealt with quickly without providing a large number of disk drives 121 in advance. As a result, the usability of the storage system can be improved while achieving a reduction in cost.

In this example, when the data amount in the virtual volume 123V reaches a predetermined value, the data in the virtual volume 123V are transferred to the externally connected volume 123E, which is connected to an unused storage area of the external storage apparatuses 200, 300. Accordingly, the unused storage areas of the storage system can be used effectively.

In this example, searches for unused storage areas within the storage system and the like are performed by the management terminals 21, 22, 23, and therefore data transfer processing can be executed without excessively increasing the processing load on the storage apparatuses 100, 200, 300.

SECOND EXAMPLE

A second example of the present invention will now be described on the basis of FIGS. 14 and 15. The following examples, including this example, correspond to modified examples of the first example described above. In this example, data transfer is executed taking into consideration the size of the unused storage area at a point in time in the future, rather than the size of the unused storage area at the point when data transfer processing is performed.

Figure 14:
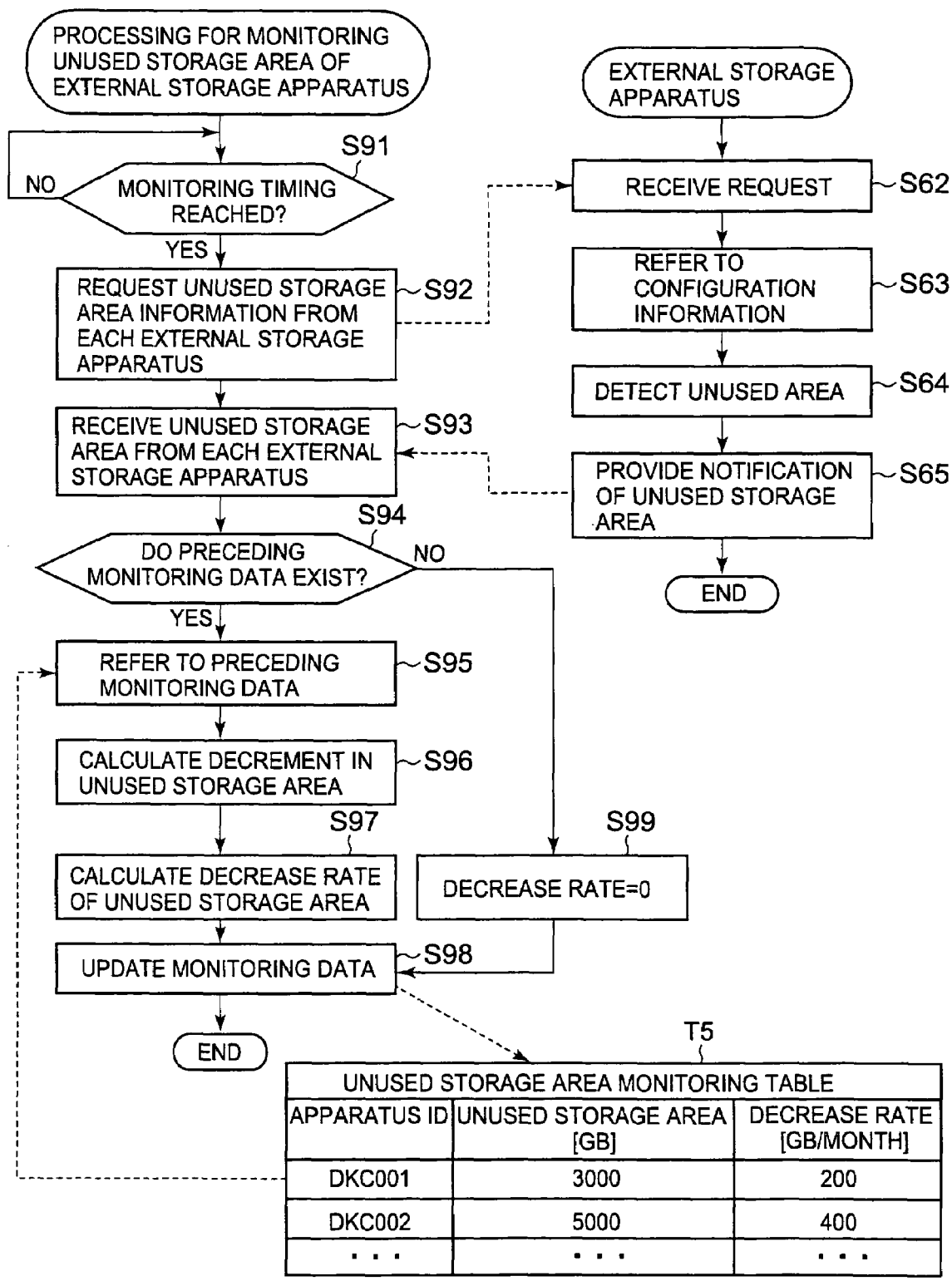
FIG. 14 is a flowchart illustrating processing for monitoring the usage condition of an unused storage area in the external storage apparatus.

FIG. 14 is a flowchart illustrating processing for monitoring the usage condition of the unused storage areas in the external storage apparatuses 200, 300. This processing may be executed by the controller 110 of the first storage apparatus 100 or the first management terminal 21. Here, it is assumed that the processing is executed by the first management terminal 21.

The first management terminal 21 determines whether or not a monitoring timing has arrived (S91). The monitoring timing may be set periodically or irregularly, or may be set freely by the user.

When the monitoring timing arrives (S91: YES), the first management terminal 21 places a request with each of the management terminals 22, 23 to transmit information relating to their unused storage areas (S92). Upon reception of the request (S62), the management terminals 22, 23 refer to the configuration information to detect their respective unused storage areas (S63, S64), and provide the first management terminal 21 with information relating to their respective unused storage areas (S65).

Upon reception of this information from the management terminals 22, 23 (S93), the first management terminal 21 determines whether or not preceding monitoring data are stored (S94). When monitoring data obtained during the preceding monitoring processing exist (S94: YES), the first management terminal 21 refers to the preceding monitoring data (S95) to calculate a decrement $\Delta Vs$ in the unused storage area (S96). The first management terminal 21 then divides the calculated decrement $\Delta Vs$ by a time period between the preceding monitoring timing and the current monitoring timing to determine a decrease rate a (S97). The first management terminal 21 then stores the calculated decrease rate a in an unused storage area monitoring table T5 (S98). On the other hand, when preceding monitoring data do not exist (S94: NO), the first management terminal 21 sets "0" as the decrease rate $\alpha$ (S99), and stores this in the monitoring table T5 (S98).

The monitoring table T5 may be stored in advance in the shared memory 114 of the first storage apparatus 100 and local memory in the first management terminal 21, for example. The monitoring table T5 may be constituted by associating an apparatus ID for identifying the storage apparatuses, the size of the unused storage area in the corresponding storage apparatus, and the decrease rate of the unused storage area in the storage apparatus, for example.

An example of calculation of the decrease rate $\alpha$ will now be described. It is assumed that within a time period T, the size of the unused storage area in a certain storage apparatus decreases from Vs1 to Vs2. The decrement $\Delta Vs$ in the unused storage area takes a value obtained by subtracting Vs2 from Vs1 ($\Delta Vs=Vs1-Vs2$). The decrease rate $\alpha$ of the unused storage area takes a value obtained by dividing the decrement $\Delta Vs$ by the time period T ($\alpha=\Delta Vs/T$). Various values may be used as the time period T.

Figure 15:
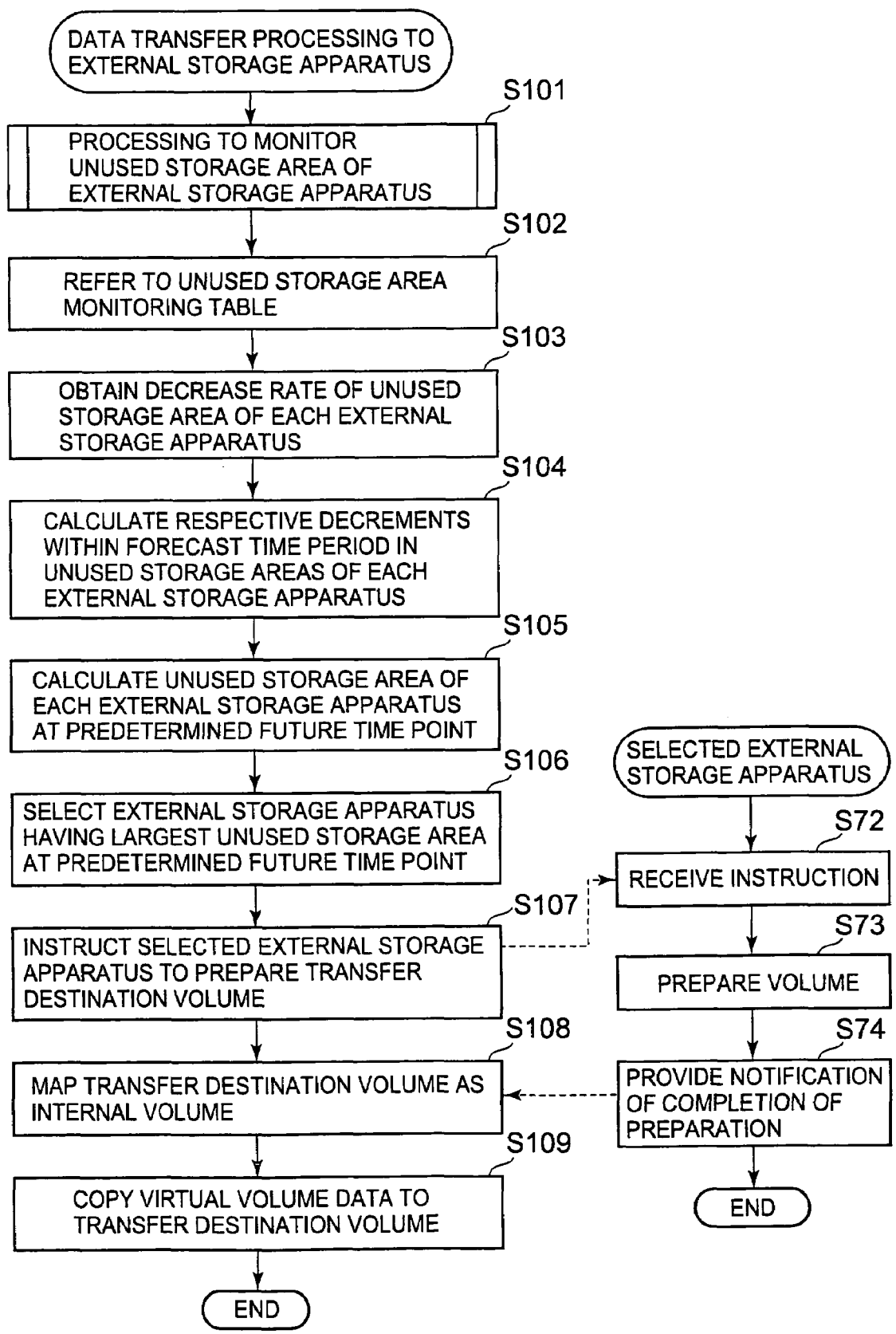
FIG. 15 is a flowchart illustrating data transfer processing to an external storage apparatus, executed by a storage system according to a second example.

FIG. 15 is a flowchart illustrating data transfer processing to an external storage apparatus according to this example. Similarly to the first example described above, this processing may be executed by either the controller 110 of the first storage apparatus 100 or the first management terminal 21. Here, it is assumed that the processing is executed by the first management terminal 21.

The first management terminal 21 performs monitoring processing relating to the unused storage areas in the external storage apparatuses 200, 300 (S101). This processing was described with reference to FIG. 14. The first management terminal 21 then refers to the monitoring table T5 (S102) to obtain the respective decrease rates $\alpha$ of the external storage apparatuses 200, 300 (S103).

Next, the first management terminal 21 calculates the respective decrements in the unused storage areas of the external storage apparatuses 200, 300 following the elapse of a predetermined forecast time period from the current time (S104). If the forecast time period is set as T1 and the decrease rate is set as $\alpha$, then the decrement $\Delta Vs(T1)$ following the elapse of T1 from the current time is determined as $\Delta Vs(T1)=T1 \times \alpha$.

Next, the first management terminal 21 calculates respective predicted sizes Vsx of the unused storage areas in the external storage apparatuses 200, 300 following the elapse of the forecast time period T1 from the current time (S105). Assuming that the size of the unused storage area at the current time is Vs(a), the predicted size Vsx is determined as $Vsx=Vs(a)-\Delta Vs(T1)$.

The first management terminal 21 predicts the future size of the unused storage area in each of the external storage apparatuses 200, 300 in this manner, and then selects the external storage apparatus that is predicted to have the largest unused storage area (S106). An instruction is then issued to the selected external storage device in a similar manner to that of the example described above (S107), instructing the selected external storage device to prepare a data transfer destination volume (S72 to S73), whereupon the data in the virtual volume 123V are transferred to the corresponding external volume (S108, S109).

Similar effects to those of the first example are also exhibited in this example. Moreover, in this example the usage condition of the unused storage area in each external storage apparatus 200, 300 is monitored, and hence an external storage apparatus can be selected appropriately on the basis of the size of the unused storage area following the elapse of a predetermined forecast time period from the beginning of data transfer processing.

For example, even if a certain external storage apparatus has a comparatively large unused storage area at the present time, this unused storage area may become depleted in the near future if the update frequency from the host 10 is large. Therefore, it is not always appropriate to select an external storage apparatus that is used frequently by the host 10. In this example, on the other hand, the external storage apparatus that is to serve as the data transfer destination can be selected appropriately on the basis of the size of the unused storage area following the elapse of a predetermined forecast time period (one month, for example).

THIRD EXAMPLE

A third example will now be described on the basis of FIG. 16. In this example, in place of the area acquisition processing described with reference to FIG. 13, a surplus unused storage area supported by the host 10 is released forcibly for use.

Figure 16:
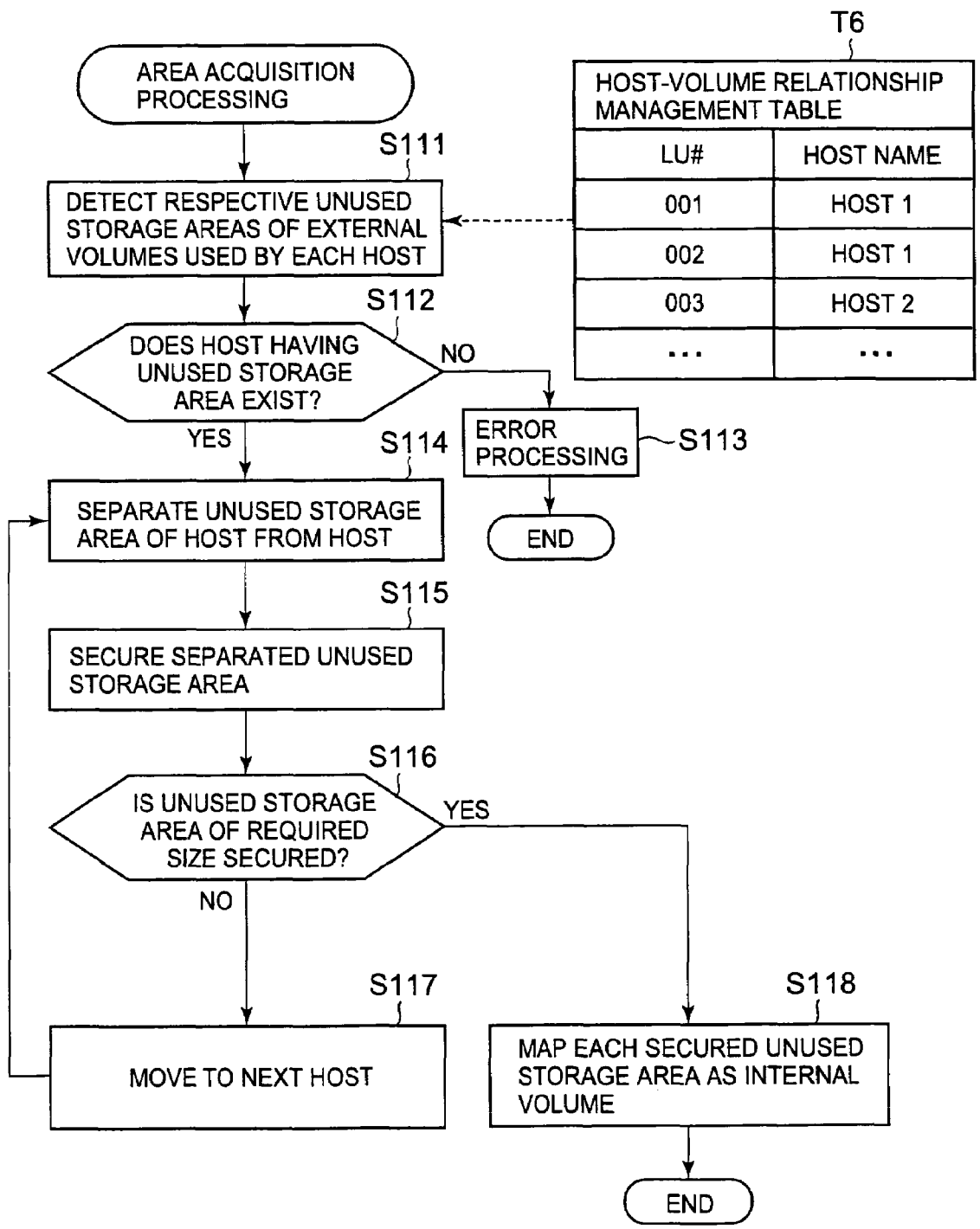
FIG. 16 is a flowchart illustrating area acquisition processing executed by a storage system according to a third example.

FIG. 16 is a flowchart illustrating area acquisition processing according to this example. This processing may be executed by either the controller 110 of the first storage apparatus 100, or the first management terminal 21. As above, it is assumed here that the processing is executed by the first management terminal 21.

The first management terminal 21 refers to a host-volume relationship table T6 and the volume configuration management table T4 to detect the unused storage areas of the external volumes currently being used by each host 10 (S111). The table T6 is constituted by associating the LU number with host identification information, for example.

The first management terminal 21 then determines whether or not any of the hosts 10 are using an unused storage area of an external storage apparatus (S112). In other words, the first management terminal 21 determines whether or not any of the hosts 10 are using an unused storage area of the external storage apparatuses 200, 300 via the first storage apparatus 100. If none of the hosts 10 is using an unused storage area (S112: NO), the first management terminal 21 is unable to secure a data transfer destination storage area, and therefore performs error processing (S113).

If one of the hosts 10 is using an unused storage area (S112: YES), the first management terminal 21 separates the unused storage area from the host 10 (S114) and secures the unused storage area as the data transfer destination storage area (S115). The first management terminal 21 continues to separate surplus unused storage areas from each of the hosts 10 and secure these unused storage areas (S116: N0, S117) until an unused storage area of the predetermined size is obtained (S116). When an unused storage area of the predetermined size has been obtained (S116: YES), the first management terminal 21 associates the secured unused storage area with the externally connected volume 123E, and then copies the data in the pool area 123P to the externally connected volume 123E (S118).

Similar effects to those of the first example are also exhibited in this example. Moreover, in this example, available capacity supported wastefully by the hosts 10 is released and made available for use as the data transfer destination volume, and therefore the storage resources of the storage system can be used efficiently.

Note that the present invention is not limited to the examples described above, and may be subjected to various additions, modifications, and so on within the scope of the present invention by a person skilled in the art.

What is claimed is:

1. A storage system for performing data processing corresponding to a request from an upper level apparatus, in which a storage control apparatus is connected communicably to another storage control apparatus that is different from said storage control apparatus, wherein said storage control apparatus comprises:
a first volume constructed virtually;
a second volume for storing data targeted at said first volume;
a management unit for managing the relationship between a storage space of said first volume and a storage space of said second volume;
a third volume generated in association with a storage area provided in said other storage control apparatus; and
a control unit for performing data input/output to and from said second volume based on an access request issued by said upper level apparatus in relation to said first volume, and in a predetermined case, storing first volume data, which are stored in said second volume, in said third volume.

2. The storage system according to claim 1, wherein said control unit switches a data provision source for providing data to said upper level apparatus from said first volume to said third volume.

3. The storage system according to claim 1, wherein said control unit stores said first volume data, which are stored in said second volume, in said third volume when the amount of said first volume data stored in said second volume reaches a preset, predetermined value.

4. The storage system according to claim 1, wherein said control unit generates said third volume in association with said storage area when said predetermined case occurs.

5. The storage system according to claim 1, wherein said other storage control apparatus is provided in a plurality, and
wherein when said predetermined case occurs, said control unit selects the other storage control apparatus having the largest unused storage area from among a plurality of other storage control apparatuses, and generates said third volume in association with said unused storage area provided in said selected other storage control apparatus.

6. The storage system according to claim 1, wherein said other storage control apparatus is provided in a plurality, and
wherein when said predetermined case occurs, said control unit selects the storage control apparatus predicted to have the largest unused storage area from among a plurality of other storage control apparatuses, and generates said third volume in association with the current unused storage area provided in said selected other storage control apparatus.

7. The storage system according to claim 1, wherein said storage control unit comprises a unique storage area, and
wherein when an unused storage area of at least a predetermined size does not exist in said unique storage area, said control unit generates said third volume in association with a storage area provided in said other storage control apparatus.

8. The storage system according to claim 1, wherein said control unit releases an unused storage area currently being used by said upper level apparatus, from the unused storage area provided in said other storage control apparatus, and generates said third volume in association with said released unused storage area.

9. A control method for a storage system which performs data processing corresponding to a request from an upper level apparatus, in which a storage control apparatus is connected communicably to another storage control apparatus that is different from said storage control apparatus,
the control method comprising the steps of:
associating a first volume constructed virtually with a second volume for storing data targeted at said first volume;
performing data input/output to and from said second volume on the basis of an access request issued by said upper level apparatus in relation to said first volume;
monitoring whether or not first volume data, which are stored in said second volume, have reached a preset, predetermined value;
generating a third volume in association with a storage area provided in said other storage control apparatus when said first volume data stored in said second volume reach said predetermined value;
storing said first volume data, stored in said second volume, in said third volume; and
switching a data provision source for providing data to said upper level apparatus from said first volume to said third volume.

10. A storage control apparatus which is connected to another storage control apparatus and an upper level apparatus respectively via different communication networks, said storage control apparatus comprising:
a first volume constructed virtually;
a second volume for storing data targeted at said first volume;
a management unit for managing the relationship between a storage space of said first volume and a storage space of said second volume;
a third volume generated in association with a storage area provided in said other storage control apparatus; and
a control unit for performing data input/output to and from said second volume based on an access request issued by said upper level apparatus in relation to said first volume, and in a predetermined case, storing first volume data, which are stored in said second volume, in said third volume.

* * * * *